US010718950B2

(12) United States Patent
Kamakura

(10) Patent No.: US 10,718,950 B2
(45) Date of Patent: Jul. 21, 2020

(54) HEAD-MOUNTED DISPLAY APPARATUS

(71) Applicant: SEIKO EPSON CORPORATION, Tokyo (JP)

(72) Inventor: Kazuya Kamakura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/666,552

(22) Filed: Oct. 29, 2019

(65) Prior Publication Data

US 2020/0133011 A1 Apr. 30, 2020

(30) Foreign Application Priority Data

Oct. 30, 2018 (JP) .................................. 2018-203921

(51) Int. Cl.
*G02B 27/01* (2006.01)
*G02C 5/12* (2006.01)

(52) U.S. Cl.
CPC ..... *G02B 27/0176* (2013.01); *G02B 27/0172* (2013.01); *G02C 5/122* (2013.01); *G02B 2027/0178* (2013.01); *G02C 2200/06* (2013.01)

(58) Field of Classification Search
CPC combination set(s) only.
See application file for complete search history.

(56) References Cited

U.S. PATENT DOCUMENTS

| 6,480,174 | B1 * | 11/2002 | Kaufmann | G02B 27/0172 |
| | | | | 345/7 |
| 9,207,456 | B2 * | 12/2015 | Hiraide | G02B 27/0176 |
| 9,291,823 | B2 * | 3/2016 | Cazalet | G02C 11/10 |
| 9,690,326 | B2 * | 6/2017 | Ryu | G06F 1/1656 |
| 9,989,771 | B2 * | 6/2018 | Kamakura | G02B 27/0176 |
| 10,025,104 | B2 * | 7/2018 | Kamakura | G02B 27/0176 |
| 10,073,273 | B2 * | 9/2018 | Miyao | G02B 27/0176 |
| 10,203,497 | B2 * | 2/2019 | Kamakura | G02B 27/0006 |
| 10,268,042 | B2 * | 4/2019 | Kamakura | G02B 30/24 |
| 10,345,581 | B2 * | 7/2019 | Kamakura | G02B 27/0172 |
| 10,502,961 | B2 * | 12/2019 | Miyao | G02B 6/0001 |
| 2012/0206816 | A1 * | 8/2012 | Yoshida | G02B 27/0172 |
| | | | | 359/630 |
| 2013/0250503 | A1 * | 9/2013 | Olsson | G02C 5/12 |
| | | | | 361/679.03 |

FOREIGN PATENT DOCUMENTS

JP 2012-168297 A 9/2012

* cited by examiner

*Primary Examiner* — Lisa Lea-Edmonds
(74) *Attorney, Agent, or Firm* — Oliff PLC

(57) ABSTRACT

A head-mounted display apparatus includes a display unit configured to emit image light to display an image, a support portion that supports the display unit, and a nose pad attached to the support portion. The support portion includes an attachment portion to which the nose pad is attached. The nose pad includes an insertion portion inserted into the attachment portion. The attachment portion includes an insertion opening into which the insertion portion is inserted, and a locking portion configured to lock the nose pad in a first position and a second position that are different from each other in a rotational direction of the nose pad centered at the insertion portion inserted into the insertion opening.

9 Claims, 14 Drawing Sheets

HEAD-MOUNTED DISPLAY APPARATUS

The present application is based on, and claims priority from JP Application Serial Number 2018-203921, filed Oct. 30, 2018, the disclosure of which is hereby incorporated by reference herein in its entirety.

BACKGROUND

1. Technical Field

The invention relates to a head-mounted display apparatus.

2. Related Art

In the related art, a display apparatus including a nose pad that abuts a user's nose has been known as a head-mounted display apparatus (see, for example, JP-A-2012-168297).

In the display apparatus described in JP-A-2012-168297, the nose pad is attached to an attachment member provided on a frame. The attachment member is constituted by a first member and a second member having a box shape.

A latch member being a plate spring is provided on a bottom surface of the first member. By providing a protruding portion at one place of a surface facing a first side surface of the first member in a pad attachment portion of the nose pad, and by providing, on the latch member, a plurality of recessed portions that fit with the protruding portion, positioning of the nose pad with respect to the attachment member and a vertical movement of the nose pad can be achieved.

However, in the display apparatus described in JP-A-2012-168297, since the attachment member that holds the nose pad to be movable vertically is constituted by a plurality of members, there is a problem that a configuration of the attachment member is complicated, and assembly of the head-mounted display apparatus is complicated.

SUMMARY

A head-mounted display apparatus according to one aspect of the present disclosure includes a display unit configured to emit image light to display an image, a support portion that supports the display unit, and a nose pad attached to the support portion, where the support portion includes an attachment portion to which the nose pad is attached, the nose pad includes an insertion portion inserted into the attachment portion, and the attachment portion includes an insertion opening into which the insertion portion is inserted, and a locking portion configured to lock the nose pad in a first position and a second position that are different from each other in a rotational range of the nose pad centered at the insertion portion inserted into the insertion opening.

In one aspect described above, preferably, the nose pad may include a first nose rest portion and a second nose rest portion, a rotational direction of the nose pad may be a direction intersecting a first axis that connects the first nose rest portion and the second nose rest portion when viewed from a first direction in which the display unit emits the image light, and the attachment portion may include, as the locking portion, a first locking portion configured to lock the nose pad in the first position, and a second locking portion configured to lock the nose pad in the second position.

In one aspect described above, preferably, the attachment portion may include a rotation support portion that is located inside the insertion opening, is configured to engage with a tip portion of the insertion portion in an insertion direction into the insertion opening, and is configured to rotatably supports the nose pad about the tip portion.

In one aspect described above, preferably, the insertion portion may include a shaft portion that extends along the first axis when viewed from the first direction, and is supported by the rotation support portion to serve as a rotational movement shaft of the nose pad, two first extending portions extending in the first direction from a first end side and a second end side of the shaft portion, and two second extending portions respectively extending, in directions that are away from each other, from sides of the two first extending portions opposite from the shaft portion, and at least one second extending portion of the two second extending portions may be locked by one of the first locking portion and the second locking portion.

In one aspect described above, preferably, each of the first locking portion and the second locking portion may be a recessed portion into which the two second extending portions fit.

In one aspect described above, preferably, the attachment portion may include a regulating portion that is located between the first locking portion and the second locking portion, is configured to abut the two second extending portions to regulate rotation of the nose pad.

In one aspect described above, preferably, the two second extending portions may have flexibility such that the two second extending portions move toward and away from each other.

In one aspect described above, preferably, the nose pad may include a first nose rest portion and a second nose rest portion, a first rocking support portion that rockingly supports the first nose rest portion, a second rocking support portion that rockingly supports the second nose rest portion, a first connecting portion that couples the insertion portion and the first rocking support portion, and a second connecting portion that couples the insertion portion and the second rocking support portion, and at least one connecting portion of the first connecting portion and the second connecting portion may include a first component extending in a direction away from the insertion portion, a second component extending from the first component in a direction that intersects each of a direction parallel to a first axis connecting the first nose rest portion and the second nose rest portion and an insertion direction of the insertion portion with respect to the attachment portion, and that is directed from the insertion portion toward a nose rest portion, coupled to the at least one connecting portion, among the first nose rest portion and the second nose rest portion, a third component being bent with respect to the second component in a direction along an extending direction of the second component and away from the insertion portion, and a fourth component that extends from the third component, and is coupled to a rocking support portion, coupled to the at least one connecting portion, among the first rocking support portion and the second rocking support portion.

In one aspect described above, preferably, the display unit may include a left-side light guiding unit configured to guide left eye image, and a right-side light guiding unit configured to guide right eye image, the support portion may include a frame that supports the left-side light guiding unit and the right-side light guiding unit, and the attachment portion may be located between the left-side light guiding unit and the right-side light guiding unit, and attaches the left-side light guiding unit and the right-side light guiding unit to the frame.

DESCRIPTION OF EXEMPLARY EMBODIMENTS

An exemplary embodiment of the present disclosure will be described below with reference to the drawings.

Schematic Configuration of Head-mounted Display Apparatus

Figure 1:
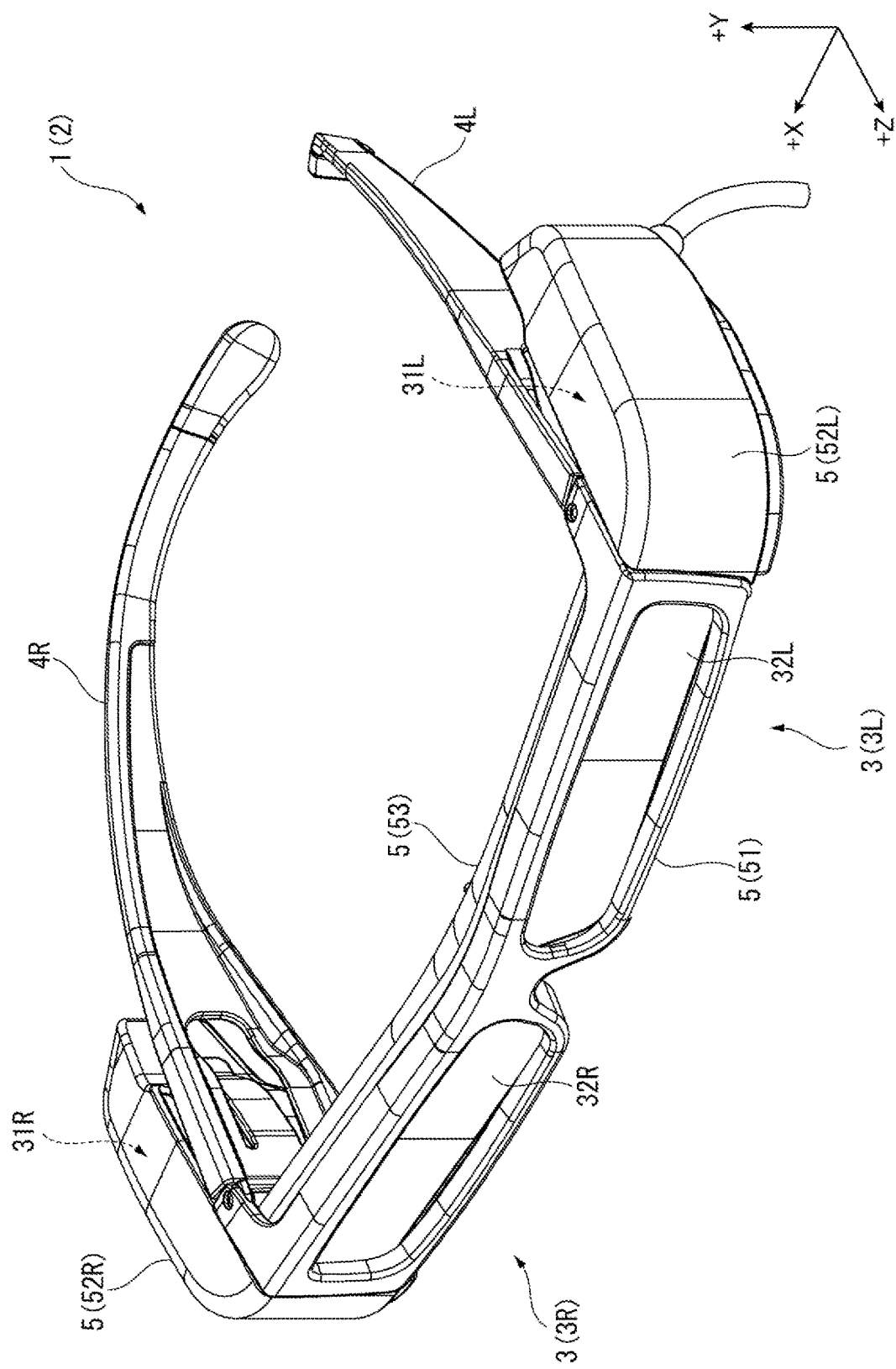
FIG. 1 is a perspective view illustrating a head-mounted display apparatus according to an exemplary embodiment.
Figure 2:
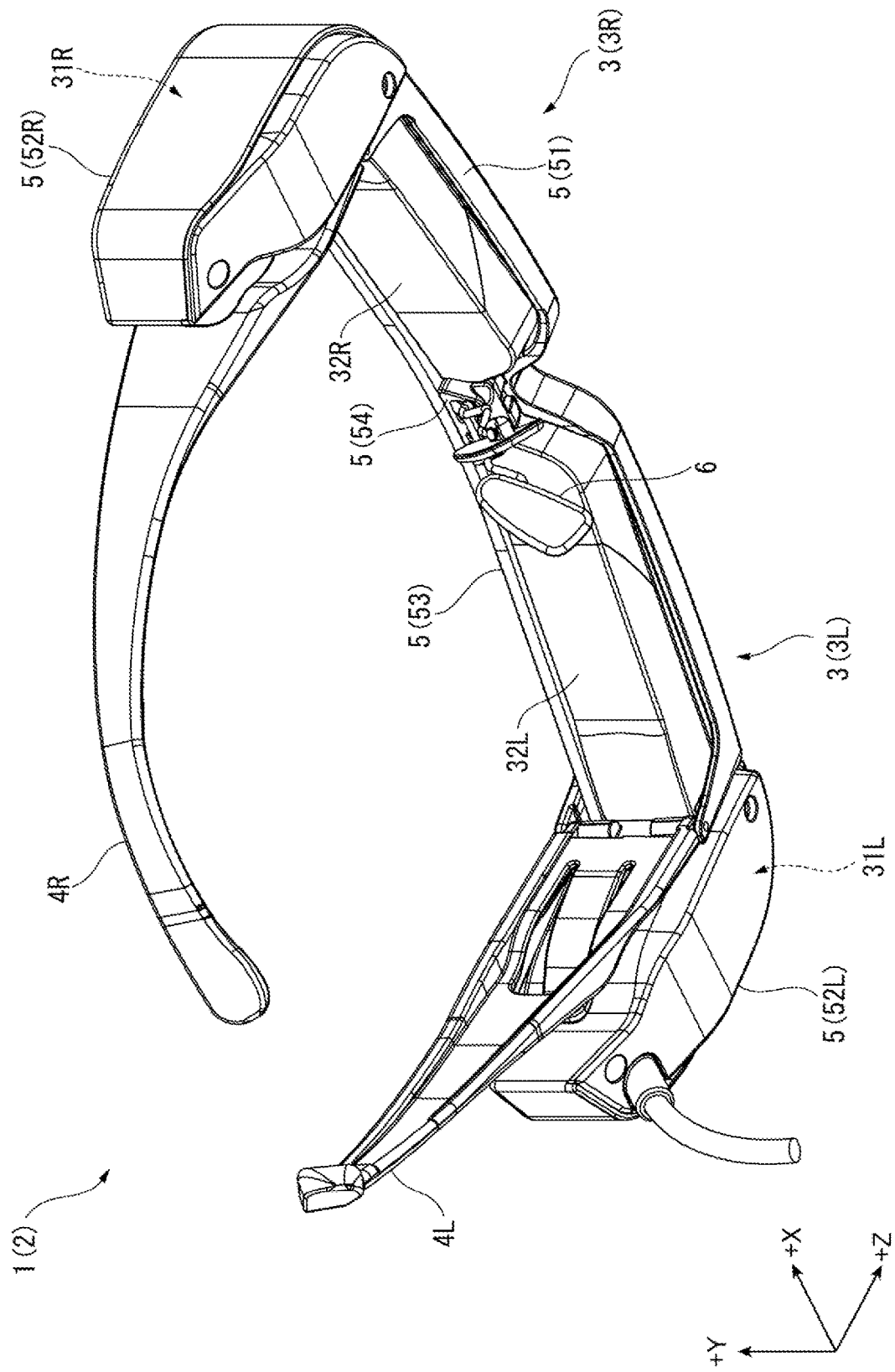
FIG. 2 is a perspective view illustrating the head-mounted display apparatus according to the exemplary embodiment.

FIGS. 1 and 2 are perspective views of a head-mounted display apparatus 1 according to the present exemplary embodiment viewed from above a front surface side and below a rear surface side.

The head-mounted display apparatus 1 according to the present exemplary embodiment is used to be mounted on a user's head, displays an image that can be visually recognized by the user, and is a so-called Head Mounted Display (HMD). As illustrated in FIGS. 1 and 2, the head-mounted display apparatus 1 includes an apparatus main body 2 including a display unit 3, temples 4L and 4R, and a support portion 5, and a nose pad 6 detachably attached to the support portion 5. In addition to these, the head-mounted display apparatus 1 may include a cover member that is mounted on the apparatus main body 2 to cover a left-side light guiding unit 32L and a right-side light guiding unit 32R that constitute the display unit 3.

As described later in detail, the display unit 3 includes a left-side display unit 3L and a right-side display unit 3R each configured to display an image. The support portion 5 supports the display unit 3, the temples 4L and 4R, and the nose pad 6. The temples 4L and 4R are suspended on the user's left and right ears and the nose pad 6 abuts the user's nose such that the head-mounted display apparatus 1 is mounted on the user's head.

Hereinafter, a configuration of the head-mounted display apparatus 1 will be described in detail.

In the following description, three directions perpendicular to each other are referred as an +X direction, a +Y direction, and a +Z direction, and a direction from the rear surface to the front surface of the head-mounted display apparatus 1 is referred as the +Z direction. Further, a direction from right to left when the head-mounted display apparatus 1 is viewed from the +Z direction is referred as the +X direction, and a direction from bottom to top when the head-mounted display apparatus 1 is viewed from the +Z direction is referred as the +Y direction.

Also, although not illustrated, for convenience of description, opposite directions to the +X direction, the +Y direction, and the +Z direction are referred as a −X direction, a −Y direction, and a −Z direction, respectively. In addition, axes along the +X direction, the +Y direction, and the +Z direction are referred as an X axis, a Y axis, and a Z axis, respectively.

In the present exemplary embodiment, a first axis connecting nose rest portions 62L and 62R, which will be described later, is the X axis. Further, a first direction being a direction in which the display unit 3 described later emits image light to the outside is the −Z direction. The +Z direction being the opposite direction to the −Z direction is a mounting direction of the nose pad 6 with respect to the support portion 5.

Further, the axis on which a frame 53 constituting the support portion 5 extends is the X axis. A direction from the left-side display unit 3L supported by the frame 53 toward the right-side display unit 3R is the +X direction.

Then, the +Y direction is a direction that is orthogonal to each of the +Z direction and the +X direction, and directed from a front portion 531 of the frame 53 toward the left-side light guiding unit 32L and the right-side light guiding unit 32R. The −Y direction is a direction that intersects each of the +X direction parallel to the +X axis, which is the first axis connecting the nose rest portions 62L and 62R described later, and the +Z direction being an insertion direction of an insertion portion 61 of the nose pad 6 with respect to an attachment portion 54 described later, and that is directed from the insertion portion 61 toward the nose rest portions 62L and 62R.

Note that, for a user wearing the head-mounted display apparatus 1, the +X direction is a direction from left to right, the +Y direction is a direction from bottom to top, and the +Z direction is a direction from rear to front.

For this reason, of the configuration of the head-mounted display apparatus 1, "L" is appended to a sign of a configuration disposed on the left side to the user, that is, in the −X direction, and "R" is appended to a sign of a configuration located on the right side to the user, that is, in the +X direction.

Configuration of Display Unit

The display unit 3 emits image light toward a predetermined visual recognition position to display an image formed by the image light. The predetermined visual recognition position is a position of an exit pupil formed by an optical system constituting the display unit 3. In the present exemplary embodiment, the predetermined visual recognition positions are set to a virtual position corresponding to the left eye and the right eye of the user. Then, the display unit 3 includes the left-side display unit 3L configured to emit left eye image light to the left eye of the user, which is one of the visual recognition positions, to display a left eye image, and the right-side display unit 3R configured to emit right eye image light to the right eye of the user, which is another one of the visual recognition positions, to display a right eye image.

Configuration of Left-side Display Unit

The left-side display unit 3L is located in the −X direction in the apparatus main body 2. The left-side display unit 3L includes a left-side emitting unit 31L as an image emitting unit configured to form and emit left eye image light, and the left-side light guiding unit 32L as a light guiding unit configured to guide the emitted left eye image light to the left eye of the user.

The left-side emitting unit 31L is housed in a left-side housing 52L, which will be described later, and forms and emits left eye image light according to image information input from the outside. The left-side emitting unit 31L includes a control unit, an image forming unit, and an image projection unit, which are not illustrated in the drawings.

The control unit outputs an image signal according to the input image information to the image forming unit, and causes the image forming unit to form the left eye image light according to the image information. The control unit is a circuit board on which a circuit element is mounted.

The image forming unit forms the left eye image light according to the image signal input from the control unit. The image forming unit can be constituted by a self-emitting display panel such as an organic Electro-Luminescence (EL) panel, and can also be constituted by a combination of a light source such as an LED and a light modulation device such as a device using a micromirror such as a liquid crystal panel and a MEMS mirror.

The image projection unit is constituted by a lens or a prism, and the image light formed by the image forming unit is projected in the +Z direction.

The left-side light guiding unit 32L is supported by the frame 53, which will be described later, of the support portion 5, and is disposed along the X axis in a position corresponding to the left eye of the user at a position in the +Z direction with respect to the left-side emitting unit 31L. The left-side light guiding unit 32L guides the left eye image light emitted from the left-side emitting unit 31L into the +X direction while internally reflecting the left eye image light at an interface, and emits the left eye image light in the −Z direction toward the left eye by a semi-transparent layer provided to correspond to an eyeball of the user's left eye. In other words, the left-side display unit 3L emits the left eye image light from the left-side light guiding unit 32L in the −Z direction.

The left-side light guiding unit 32L is made of a resin such as a cycloolefin polymer having high translucency in a visible light region, for example, and the user can observe an external scene via the left-side light guiding unit 32L.

Configuration of Right-Side Display Unit

The right-side display unit 3R is located in the +X direction in the apparatus main body 2. The right-side display unit 3R includes a right-side emitting unit 31R as an image emitting unit configured to form and emit right eye image light, and the right-side light guiding unit 32R as a light guiding unit configured to guide the emitted right eye image light to the right eye of the user.

The right-side emitting unit 31R is housed in a right-side housing 52R, which will be described later, and forms and emits right eye image light according to image information input from the outside. Similarly to the left-side emitting unit 31L, the right-side emitting unit 31R includes a control unit, an image forming unit, and an image projection unit.

The right-side light guiding unit 32R is supported by the frame 53 and is disposed along the X axis in a position corresponding to the right eye of the user at a position in the +Z direction with respect to the right-side emitting unit 31R. The right-side light guiding unit 32R guides the right eye image light emitted in the +Z direction from the right-side emitting unit 31R into the −X direction while internally reflecting the right eye image light at an interface, and emits the right eye image light in the −Z direction toward the right eye by a semi-transparent layer provided to correspond to an eyeball of the user's right eye. In other words, the right-side display unit 3R emits the right eye image light that forms a right eye image from the right-side light guiding unit 32R in the −Z direction. The right-side light guiding unit 32R is constituted by a material having translucency similar to that of the left-side light guiding unit 32L, for example, and the user can observe an external scene via the right-side light guiding unit 32R.

In this way, the head-mounted display apparatus 1 is configured as a see-through type head-mounted display apparatus that allows a user to observe an image and an external scene at the same time via the left-side light guiding unit 32L and the right-side light guiding unit 32R.

Configuration of Temple

As illustrated in FIGS. 1 and 2, the temple 4L is rotatably supported by the left-side housing 52L about a rotational movement shaft along the Y axis, and the temple 4R is rotatably supported by the right-side housing 52R about a rotational movement shaft along the Y axis. Then, the temples 4L and 4R are extended along the −Z direction when the user wears the apparatus main body 2 on the head, and are suspended on the left and right ears of the user.

Note that, in the present exemplary embodiment, the temple 4L is disposed on the center side of the head-mounted display apparatus 1 in the +X direction with respect to the left-side emitting unit 31L housed in the left-side housing 52L. The temple 4R is disposed on the center side of the head-mounted display apparatus 1 in the +X direction with respect to the right-side emitting unit 31R housed in the right-side housing 52R. In other words, the temple 4L is located in the +X direction with respect to the left-side emitting unit 31L, and the temple 4R is located in the −X direction with respect to the right-side emitting unit 31R. However, the present exemplary embodiment is not limited to this. The arrangement positions of the temples 4L and 4R may be anywhere, and the temples 4L and 4R may be supported at end portions in the −Z direction of the left-side housing 52L and the right-side housing 52R, for example. Further, the temples 4L and 4R may not be rotatably supported, and may be fixed.

Configuration of Support Portion

Figure 3:
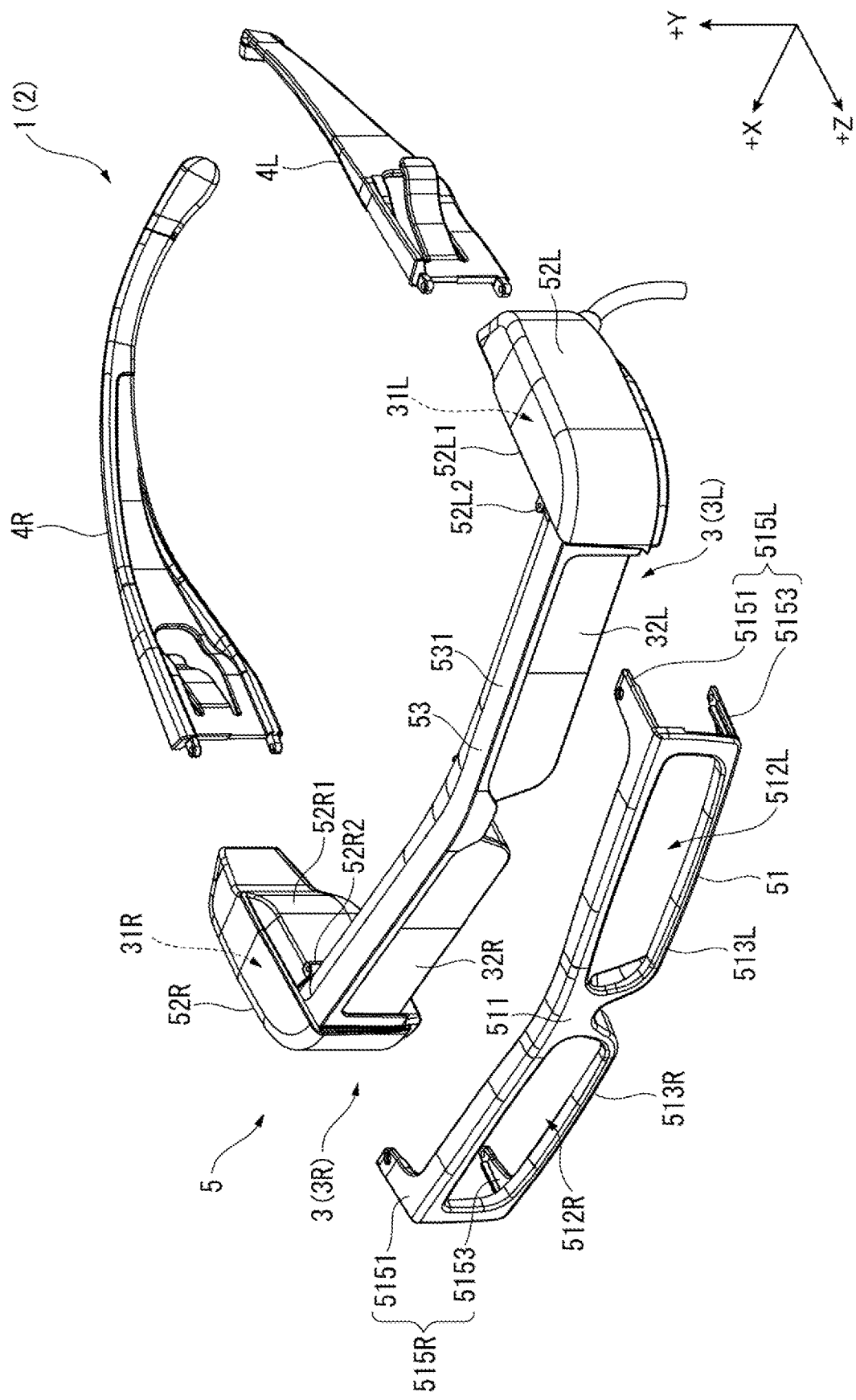
FIG. 3 is an exploded perspective view illustrating a support portion according to the exemplary embodiment.
Figure 4:
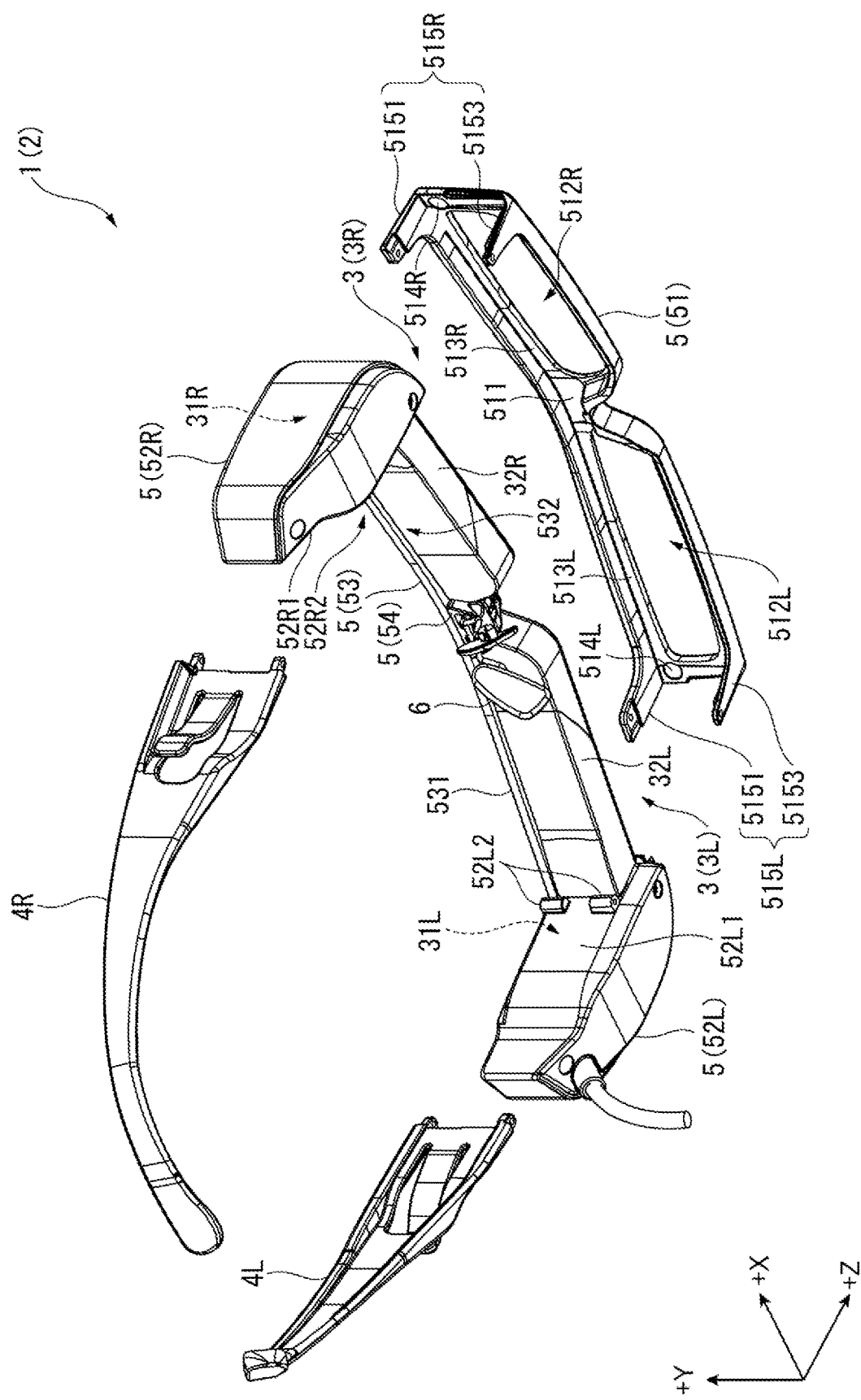
FIG. 4 is an exploded perspective view illustrating the support portion according to the exemplary embodiment.

FIGS. 3 and 4 are exploded perspective views illustrating the support portion 5 viewed from above the front surface side and below the rear surface side. More specifically, FIGS. 3 and 4 are exploded perspective views when the apparatus main body 2 in a state where the temples 4L and 4R and a mounting member 51 are separated from the left-side housing 52L, the right-side housing 52R, and the frame 53 is viewed from above the front surface side and below the rear surface side.

The support portion 5 supports the display unit 3, the temples 4L and 4R, and the nose pad 6. As illustrated in FIGS. 3 and 4, the support portion 5 includes the mounting member 51, the left-side housing 52L, the right-side housing 52R, the frame 53, and the attachment portion 54.

Configuration of Mounting Member

The mounting member 51 is fixed to the left-side housing 52L and the right-side housing 52R so as to cover the frame 53, the left-side light guiding unit 32L, and the right-side light guiding unit 32R in the +Z direction. The mounting member 51 is a portion of the support portion 5 where the cover member is detachably mounted in the +Z direction.

The mounting member 51 includes a main body 511 disposed in the +Z direction with respect to the left-side light guiding unit 32L and the right-side light guiding unit 32R, and fixing portions 515L and 515R that each extend in the −Z direction from the main body 511.

The main body 511 includes a left-side frame portion 513L that forms a left-side opening 512L, and a right-side frame portion 513R that forms a right-side opening 512R. In addition, as illustrated in FIG. 4, the main body 511 includes magnets 514L and 514R that are disposed at a corner portion in the −X direction and at a corner portion in the +X direction of a surface in the −Z direction of the main body 511, and attract the cover member.

As illustrated in FIGS. 3 and 4, the left-side frame portion 513L is located in the +Z direction with respect to the left-side light guiding unit 32L, and surrounds a region including a display region of the left eye image displayed by the left-side light guiding unit 32L when viewed from the +Z direction.

The right-side frame portion 513R is located in the +Z direction with respect to the right-side light guiding unit 32R, and surrounds a region including a display region of the right eye image displayed by the right-side light guiding unit 32R when viewed from the +Z direction.

If a user observes an external scene via the left-side light guiding unit 32L and the right-side light guiding unit 32R, the user's line of sight passes through the left-side opening 512L and the right-side opening 512R.

The fixing portion 515L is provided at an end portion in the −X direction of the main body 511. The fixing portion 515L includes an upper arm portion 5151 that extends in the −Z direction from an end edge in the +Y direction of the main body 511, and a lower arm portion 5153 that extends in the −Z direction from an end edge in the −Y direction of the main body 511.

The fixing portion 515R is provided at an end portion in the +X direction of the main body 511. Similarly to the fixing portion 515L, the fixing portion 515R includes an upper arm portion 5151 and a lower arm portion 5153.

Then, the upper arm portion 5151 and the lower arm portion 5153 of the fixing portion 515L are fixed to the left-side housing 52L, and the upper arm portion 5151 and the lower arm portion 5153 of the fixing portion 515R are fixed to the right-side housing 52R, and thus the mounting member 51 is fixed to the left-side housing 52L and the right-side housing 52R.

Configuration of Left-Side Housing

The left-side housing 52L is a housing made of a synthetic resin, is attached to an end portion in the −X direction of the frame 53, and houses the left-side emitting unit 31L. The left-side housing 52L includes a shaft support portion 52L2 at a portion in the +Z direction of a side surface 52L1 in the +X direction.

The shaft support portion 52L2 is a portion to which the fixing portion 515L is fixed in addition to rotatably supporting the temple 4L.

Configuration of Right-Side Housing

The right-side housing 52R is a housing made of a synthetic resin, is attached to an end portion in the +X direction of the frame 53, and houses the right-side emitting unit 31R. The right-side housing 52R includes a shaft support portion 52R2 at a portion in the +Z direction of a side surface 52R1 in the −X direction.

The shaft support portion 52R2 is a portion to which the fixing portion 515R is fixed in addition to rotatably supporting the temple 4R.

Configuration of Frame

The frame 53 is a substantially U-shaped metal member when viewed from the +Y direction, and is disposed along the X axis. In other words, a first end of the frame 53 is located in the −X direction, and a second end is located in the +X direction. As illustrated in FIGS. 3 and 4, the frame 53 includes the front portion 531 along the user's forehead.

The front portion 531 is a portion of the frame 53 along an XZ plane. The front portion 531 supports the left-side light guiding unit 32L and the right-side light guiding unit 32R by being attached with the attachment portion 54 from the −Y direction so as to sandwich the left-side light guiding unit 32L and the right-side light guiding unit 32R between a surface 532 in the −Y direction and the attachment portion 54. In other words, the attachment portion 54 is an attachment member that is attached to the surface 532 so as to be located between the left-side light guiding unit 32L and the right-side light guiding unit 32R, and supports the nose pad 6 in addition to supporting the left-side light guiding unit 32L and the right-side light guiding unit 32R together with the frame 53.

The configuration of such an attachment portion 54 will be described later in detail.

Configuration of Nose Pad

Figure 5:
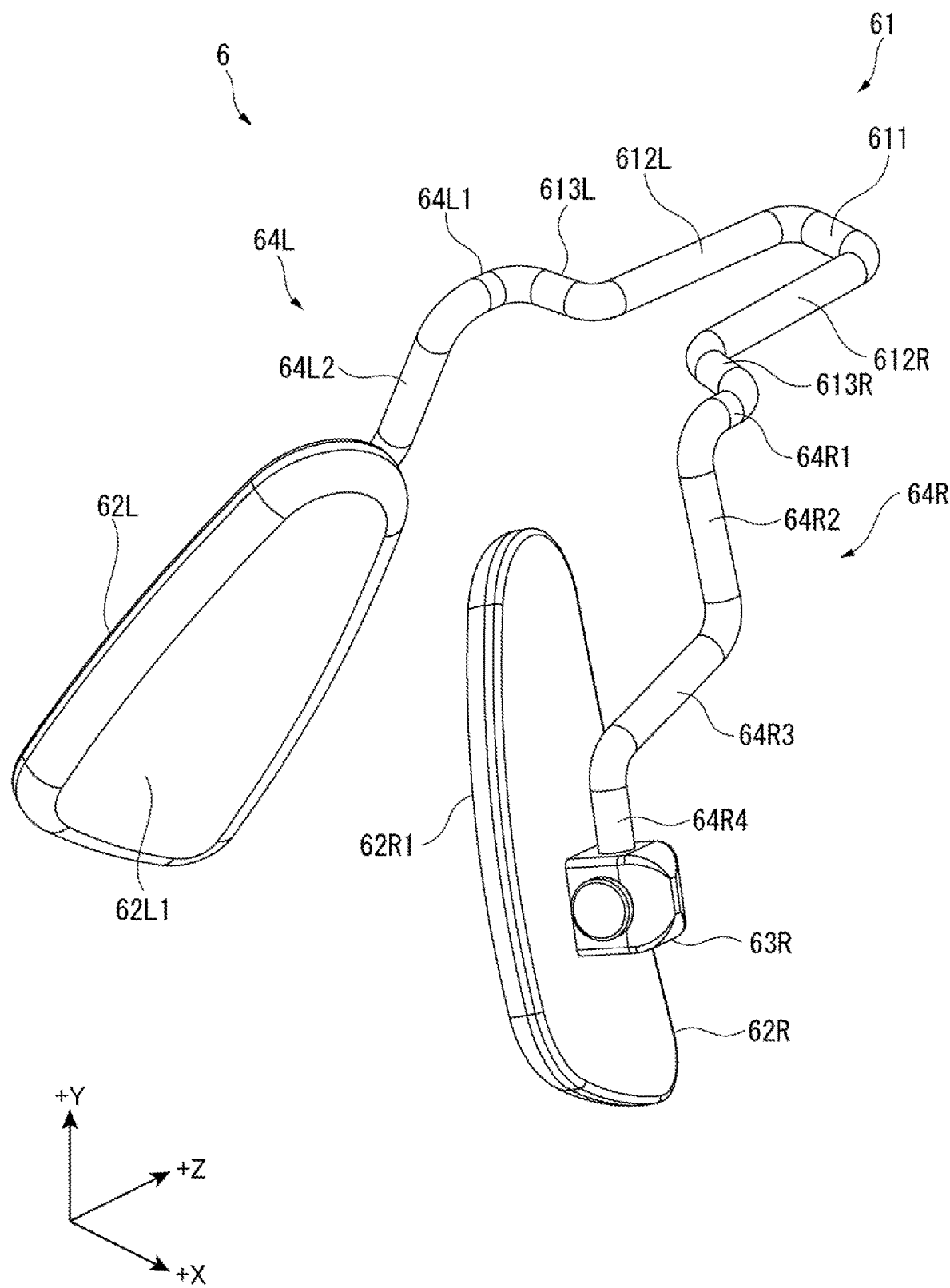
FIG. 5 is a perspective view illustrating a nose pad according to the exemplary embodiment.
Figure 6:
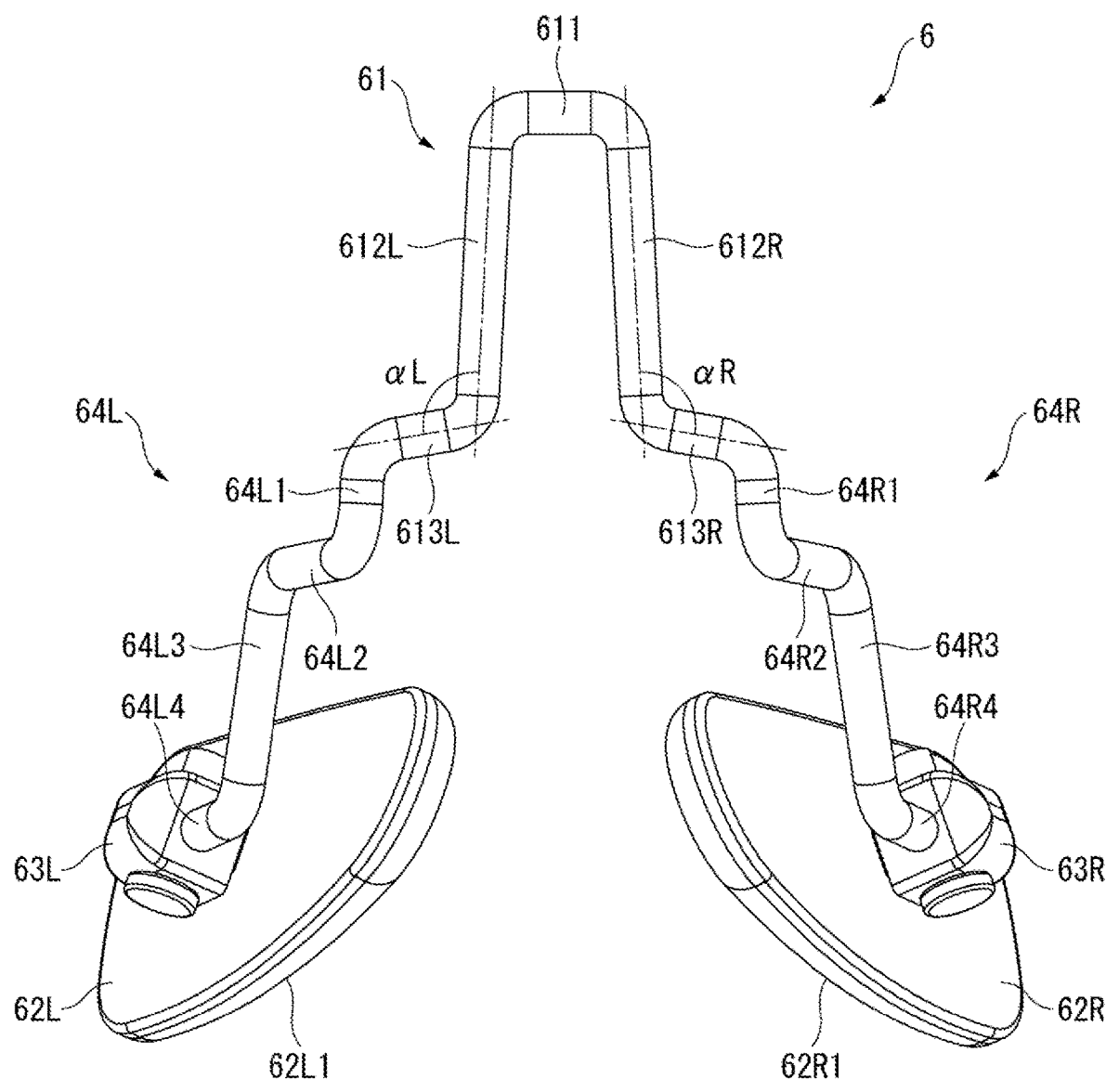
FIG. 6 is a plan view illustrating the nose pad according to the exemplary embodiment.

FIG. 5 is a perspective view of the nose pad 6 when viewed from above the rear surface side. FIG. 6 is a plan view of the nose pad 6 when viewed from the +Y direction.

The nose pad 6 is attached so as to be insertable into the attachment portion 54, and is rotatably supported in the +Y direction and the −Y direction when viewed from the −Z direction by the attachment portion 54. In other words, the nose pad 6 is provided so as to be replaceable with respect to the apparatus main body 2.

As illustrated in FIGS. 5 and 6, the nose pad 6 is configured to be mirror symmetrical about a center plane passing through the center in the +X direction and along a YZ plane. In other words, the nose pad 6 is configured to be left-right symmetrical when viewed from the +Y direction or the −Z direction.

Such a nose pad 6 includes the insertion portion 61, the nose rest portions 62L and 62R, rocking support portions 63L and 63R, and connecting portions 64L and 64R.

Configuration of Insertion Portion

The insertion portion 61 is a portion of the nose pad 6 that is inserted into the attachment portion 54 along the +Z direction, and is located in the +Z direction at a position in the +Y direction in the nose pad 6. The insertion portion 61 includes a shaft portion 611, first extending portions 612L and 612R and second extending portions 613L and 613R that are located on the same plane.

The shaft portion 611 is located at a tip portion in the +Z direction of the insertion portion 61, and is a cylindrical portion along the X axis. A shaft direction of the shaft portion 611 coincides with the rotational movement shaft of the nose pad 6 when the insertion portion 61 is inserted into and supported by an insertion opening 541, which will be described later, of the attachment portion 54.

The first extending portion 612L extends in the −Z direction from an end portion in the −X direction of the shaft portion 611, and the first extending portion 612R extends in the −Z direction from an end portion in the +X direction of the shaft portion 611. A part of the first extending portions 612L and 612R is inserted into the insertion opening 541 together with the shaft portion 611.

The second extending portions 613L and 613R respectively extend in directions, that are away from each other, from end portions of the first extending portions 612L and 612R opposite to the shaft portion 611. More specifically, the second extending portion 613L located in the −X direction extends in the −X direction from an end portion of the first extending portion 612L opposite to the shaft portion 611. The second extending portion 613R located in the +X direction extends in the +X direction from an end portion of the first extending portion 612R opposite to the shaft portion 611.

Such second extending portions 613L and 613R are portions that are locked by first locking portions 543L and 543R and second locking portions 544L and 544R, which will be described later, of the attachment portion 54.

The second extending portions 613L and 613R have rigidity that can be bent in a direction closer to and away from each other in the X axis. In other words, the second extending portions 613L and 613R have flexibility in a direction closer to and away from each other in the X axis. Thus, when the connecting portions 64L and 64R described later are displaced in a direction closer to each other, the second extending portions 613L and 613R are bent in a direction closer to each other. In this way, a locking position of the nose pad 6 in the attachment portion 54 can be changed, which will be described later in detail.

As illustrated in FIG. 6, an intersection angle αL between the second extending portion 613L and the first extending portion 612L is an obtuse angle, and an intersection angle αR between the second extending portion 613R and the first extending portion 612R is an obtuse angle. This is an action for facilitating displacement of the second extending portion 613L and the second extending portion 613R to make it easier to change a position of the nose pad 6 in the attachment portion 54.

Note that, in the present exemplary embodiment, the intersection angle αL and the intersection angle αR are the same angle, but may be different from each other, and only one intersection angle of the intersection angles αL and αR may be an obtuse angle, and the other intersection angle may be an angle other than an obtuse angle, such as a right angle, for example.

Configuration of Nose Rest Portion and Rocking Support Portion

When the head-mounted display apparatus 1 is mounted on the user's head, the nose rest portion 62L abuts a portion on the left side of the user's nose, and the nose rest portion 62R abuts a portion on the right side of the user's nose. One nose rest portion of the nose rest portions 62L and 62R corresponds to a first nose rest portion, and the other nose rest portion corresponds to a second nose rest portion.

Here, a shape of the nose that the nose rest portions 62L and 62R abut differs from user to user. For this reason, the nose rest portions 62L and 62R are rockingly supported by the rocking support portions 63L and 63R provided in a position in the −Z direction at a position in the −Y direction of the nose pad 6 so as to appropriately abut the nose.

More specifically, the nose rest portion 62L includes an abutment portion 62L1 that abuts a portion on the left side of the user's nose, and is rockingly supported by the rocking support portion 63L located in the −X direction such that the abutment portion 62L1 faces in the +X direction at a position in the −Y direction. Similarly, the nose rest portion 62R includes an abutment portion 62R1 that abuts a portion on the right side of the user's nose, and is rockingly supported by the rocking support portion 63R located in the +X direction such that the abutment portion 62R1 faces in the −X direction at a position in the −Y direction.

One rocking support portion of the rocking support portions 63L and 63R is a first rocking support portion that rockingly supports the nose rest portion corresponding to the first nose rest portion of the nose rest portions 62L and 62R, and the other rocking support portion is a second rocking support portion that rockingly supports the nose rest portion corresponding to the second nose rest portion of the nose rest portions 62L and 62R.

Configuration of Connecting Portion

The connecting portion 64L is located in the −X direction, and couples the second extending portion 613L of the insertion portion 61 and the rocking support portion 63L. The connecting portion 64R is located in the +X direction, and couples the second extending portion 613R of the insertion portion 61 and the rocking support portion 63R. In other words, one connecting portion of the connecting portions 64L and 64R is a first connecting portion coupled to the rocking support portion corresponding to the first rocking support portion of the rocking support portions 63L and 63R, and the other connecting portion corresponds to a second connecting portion coupled to the rocking support portion corresponding to the second rocking support portion of the rocking support portions 63L and 63R.

As illustrated in FIGS. 5 and 6, the connecting portion 64R includes a first component 64R1, a second component 64R2, a third component 64R3, and a fourth component 64R4.

The first component 64R1 extends from an end portion of the second extending portion 613R opposite to the first extending portion 612R in the −Z direction being a direction away from the insertion portion 61.

The second component 64R2 extends in the −Y direction from the first component 64R1. In other words, the second component 64R2 extends from the first component 64R1 in the −Y direction that intersects each of the +X direction parallel to the X axis, which the first axis connecting the nose rest portions 62L and 62R, and the +Z direction being the insertion direction of the insertion portion 61 with respect to the attachment portion 54, and that is directed from the insertion portion 61 toward the nose rest portion 62R coupled to the connecting portion 64R of the nose rest portions 62L and 62R.

The third component 64R3 is bent with respect to the second component 64R2 along the −Y direction being the extending direction of the second component and in the −Z direction being the direction away from the insertion portion 61.

The fourth component 64R4 extends in the +X direction at a position in the −Y direction from the third component 64R3, and is coupled to the rocking support portion 63R coupled to the connecting portion 64R of the rocking support portions 63L and 63R.

As illustrated in FIG. 6, the connecting portion 64L also includes a first component 64L1, a second component 64L2, a third component 64L3, and a fourth component 64L4.

The first component 64L1 extends in the −Z direction from an end portion of the second extending portion 613L opposite to the first extending portion 612L.

The second component 64L2 extends in the −Y direction from the first component 64L1.

The third component 64L3 is bent with respect to the second component 64L2 in the −Z direction at a position in the −Y direction.

The fourth component 64L4 extends in the −X direction at a position in the −Y direction from the third component 64L3, and is coupled to the rocking support portion 63L.

Insertion Direction of Nose Pad with Respect to Attachment Portion

Figure 7:
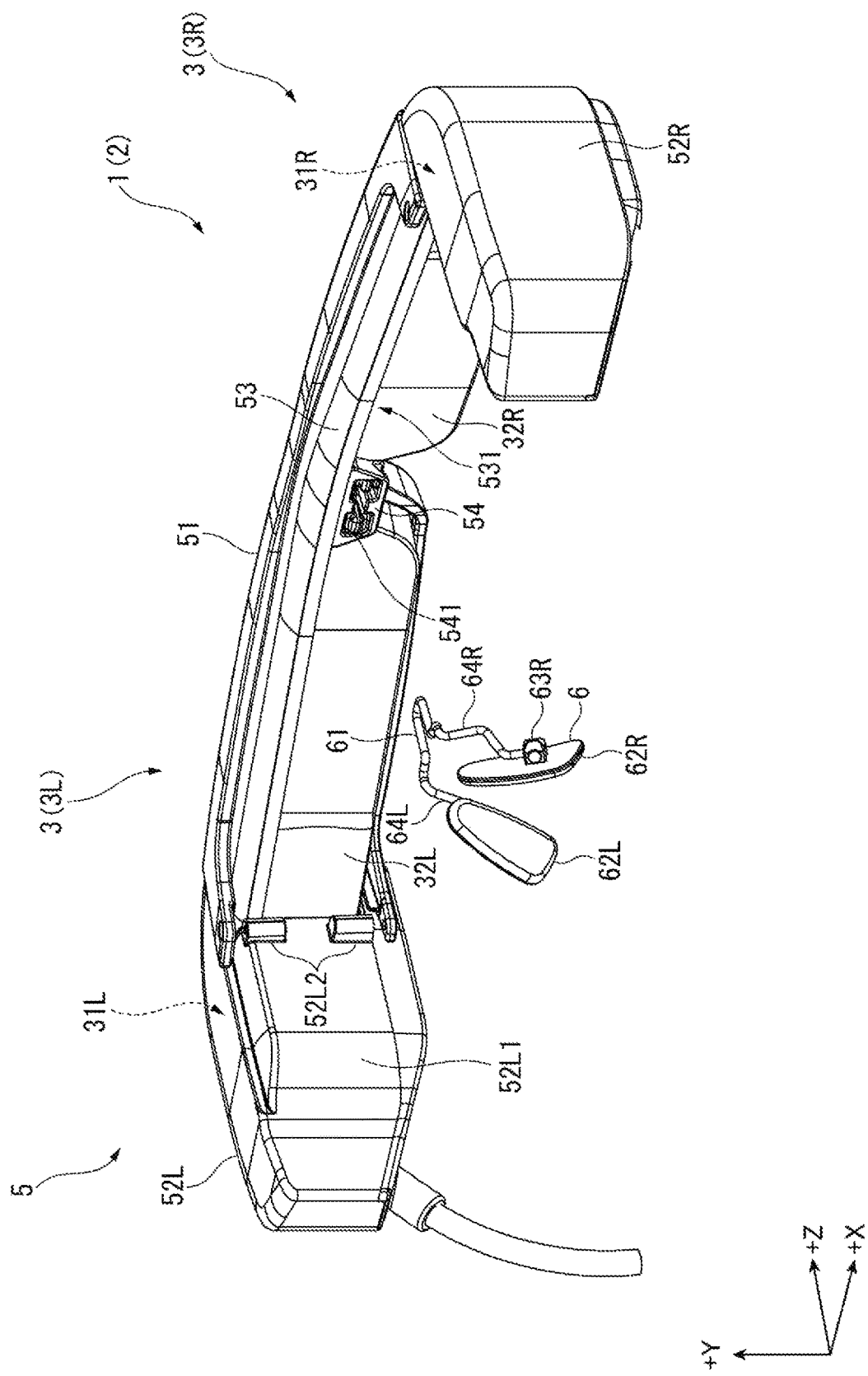
FIG. 7 is a view illustrating an insertion direction of the nose pad with respect to an attachment portion according to the exemplary embodiment.

FIG. 7 is a view illustrating the insertion direction of the nose pad 6 with respect to the attachment portion 54. Note that the temples 4L and 4R are not illustrated in the head-mounted display apparatus 1 illustrated in FIG. 7.

The nose pad 6 is attached to the attachment portion 54 provided between the left-side light guiding unit 32L and the right-side light guiding unit 32R in the frame 53. At this time, as illustrated in FIG. 7, the nose pad 6 is attached to the attachment portion 54 such that the insertion portion 61 is inserted into the insertion opening 541 of the attachment portion 54 from the −Z direction toward the +Z direction.

Configuration of Attachment Portion

Figure 8:
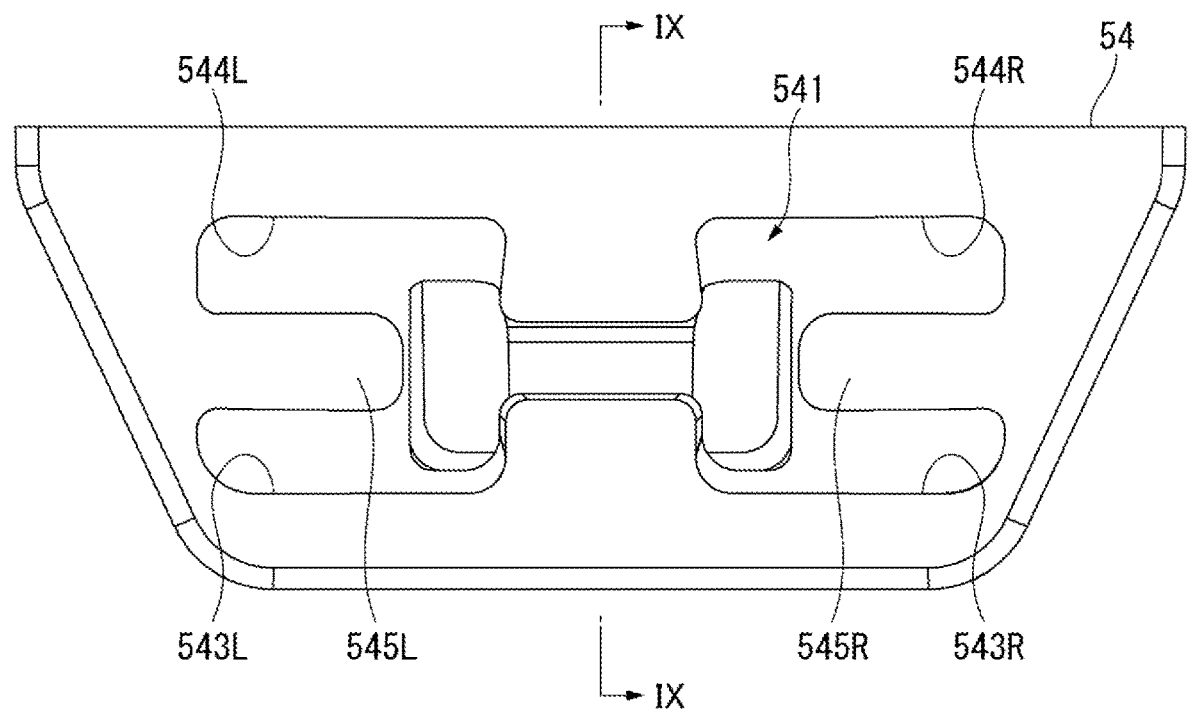
FIG. 8 is a rear view illustrating an attachment portion according to the exemplary embodiment.
Figure 8:
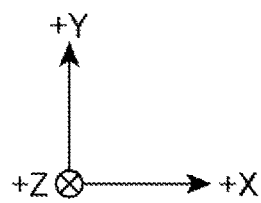
Figure 9:
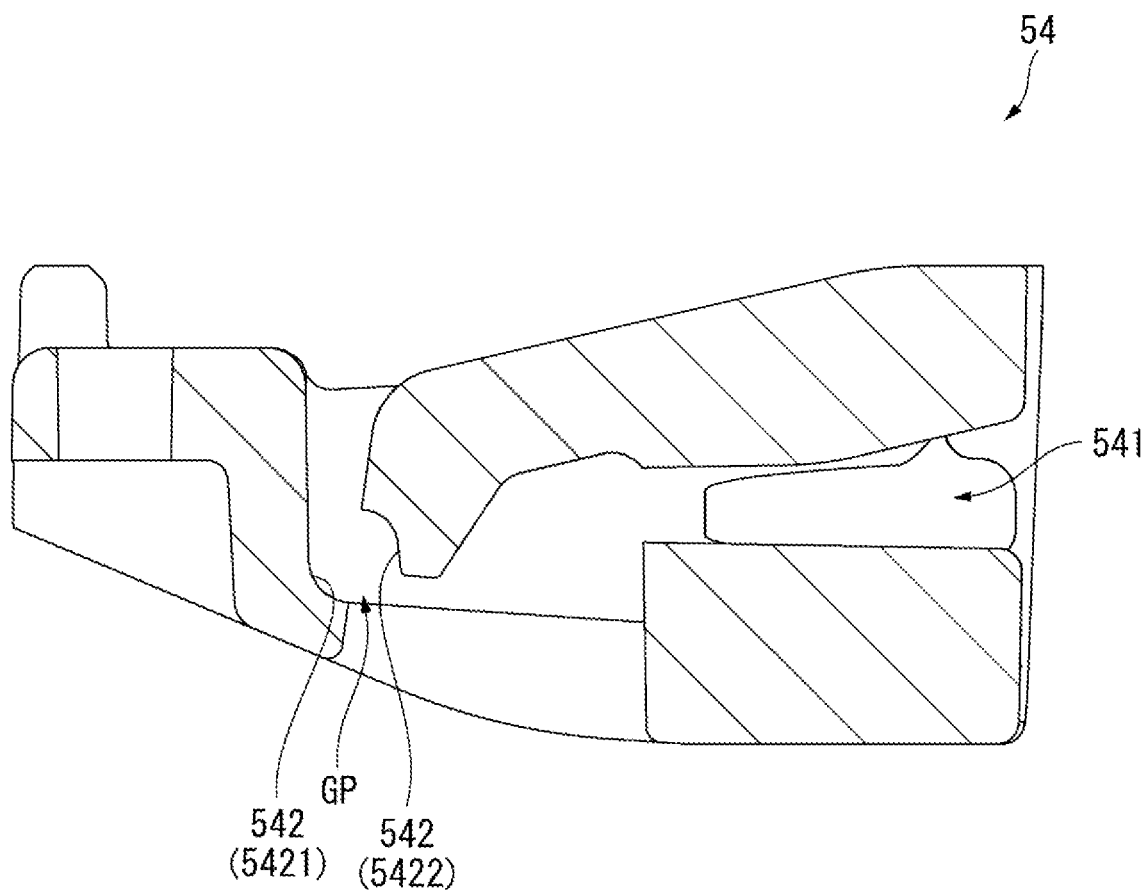
FIG. 9 is a cross-sectional view illustrating the attachment portion according to the exemplary embodiment.

FIG. 8 is a rear view of the attachment portion 54 when viewed from the −Z direction. FIG. 9 is a view illustrating a cross section of the attachment portion 54 along the YZ plane, and is a view of a cross section of the attachment portion 54 taken along an IX-IX line in FIG. 8 when viewed from the −X direction. Note that the attachment portion 54 is simplified in FIGS. 8 and 9 in order to make the configuration of the attachment portion 54 easier to see.

As illustrated in FIGS. 8 and 9, the attachment portion 54 includes the insertion opening 541 that opens in the −Z direction, a rotation support portion 542 (FIG. 9) provided inside the insertion opening 541, and the first locking portions 543L and 543R, the second locking portions 544L and 544R, and regulating portions 545L and 545R that are each provided outside the insertion opening 541.

Configuration of Insertion Opening and Rotation Support Portion

The insertion opening 541 is formed in a substantially H shape when viewed from the −Z direction. The insertion portion 61 is inserted into the insertion opening 541.

As illustrated in FIG. 9, the rotation support portion 542 is provided on a portion in the +Z direction being a depth direction of the insertion opening 541 inside the insertion opening 541. The rotation support portion 542 rotatably supports the shaft portion 611 of the insertion portion 61 inserted into the insertion opening 541 about the rotational movement shaft along the X axis.

More specifically, the rotation support portion 542 includes a first abutment surface 5421 having an arc shape that abuts a portion of the shaft portion 611 in the −Y direction at a position in the +Z direction, and a second abutment surface 5422 having an arc shape that abuts a portion of the shaft portion 611 in the +Y direction at a position in the −Z direction, and a gap GP is formed between the first abutment surface 5421 and the second abutment surface 5422.

Figure 10:
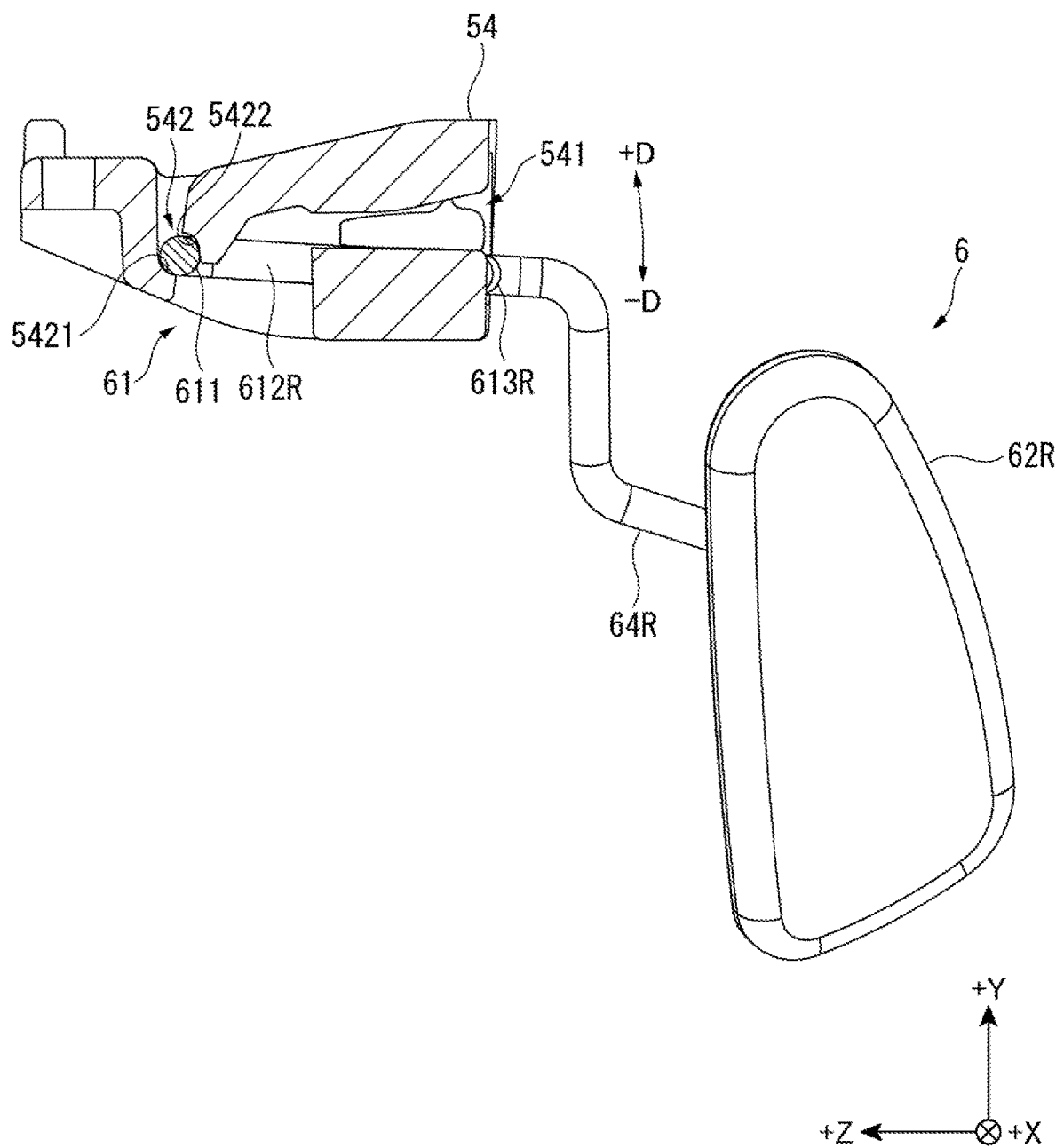
FIG. 10 is a cross-sectional view illustrating the attachment portion with the nose pad inserted therein in the exemplary embodiment.

FIG. 10 is a view illustrating a cross section along the YZ plane of the attachment portion 54 with the insertion portion 61 of the nose pad 6 inserted therein. Note that the attachment portion 54 is also simplified in FIG. 10 in order to make the configuration of the attachment portion 54 easier to see.

Then, as illustrated in FIG. 10, the shaft portion 611 abuts the first abutment surface 5421 and the second abutment surface 5422 by being inserted into the rotation support portion 542 so as to fit in the +Y direction via the gap GP. In this way, the nose pad 6 can rotate in a +D direction in which the nose pad 6 extends in the +Y direction as the first extending portions 612L and 612R extend toward the −Z direction with the shaft portion 611 along the +X direction as the center, and in a −D direction being an opposite direction to the +D direction.

Configuration of First Locking Portion

As illustrated in FIG. 8, the first locking portions 543L and 543R each extend in a direction away from an end portion in the −Y direction of the insertion opening 541 so as to communicate with the insertion opening 541.

Specifically, the first locking portion 543L extends in the −X direction from an inner end edge in the −Y direction of the insertion opening 541, and the first locking portion 543R extends in the +X direction from an inner end edge in the −Y direction of the insertion opening 541. When the insertion portion 61 is inserted into the insertion opening 541, the first locking portion 543L is a recessed portion into which the second extending portion 613L can fit, and the first locking portion 543R is a recessed portion into which the second extending portion 613R can fit. In other words, the first locking portions 543L and 543R are a recessed portion being recessed in the +Z direction.

Note that, as described above, the insertion portion 61 is inserted into the insertion opening 541 along the +Z direction, and thus when the nose pad 6 is attached to the attachment portion 54, the first locking portions 543L and 543R easily lock the second extending portions 613L and 613R.

Figure 11:
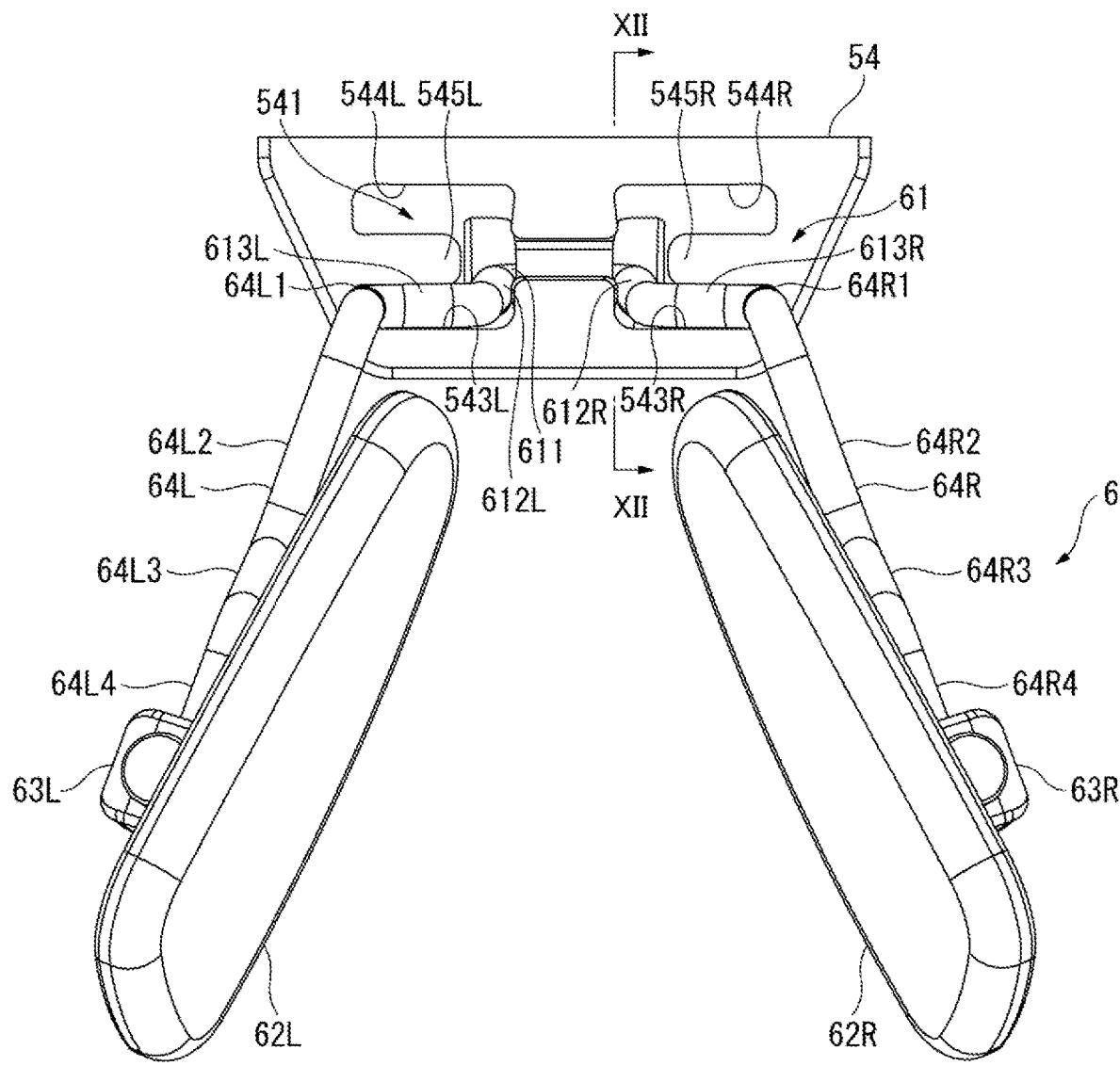
FIG. 11 is a rear view illustrating the nose pad and the attachment portion disposed in a first position in the exemplary embodiment.
Figure 12:
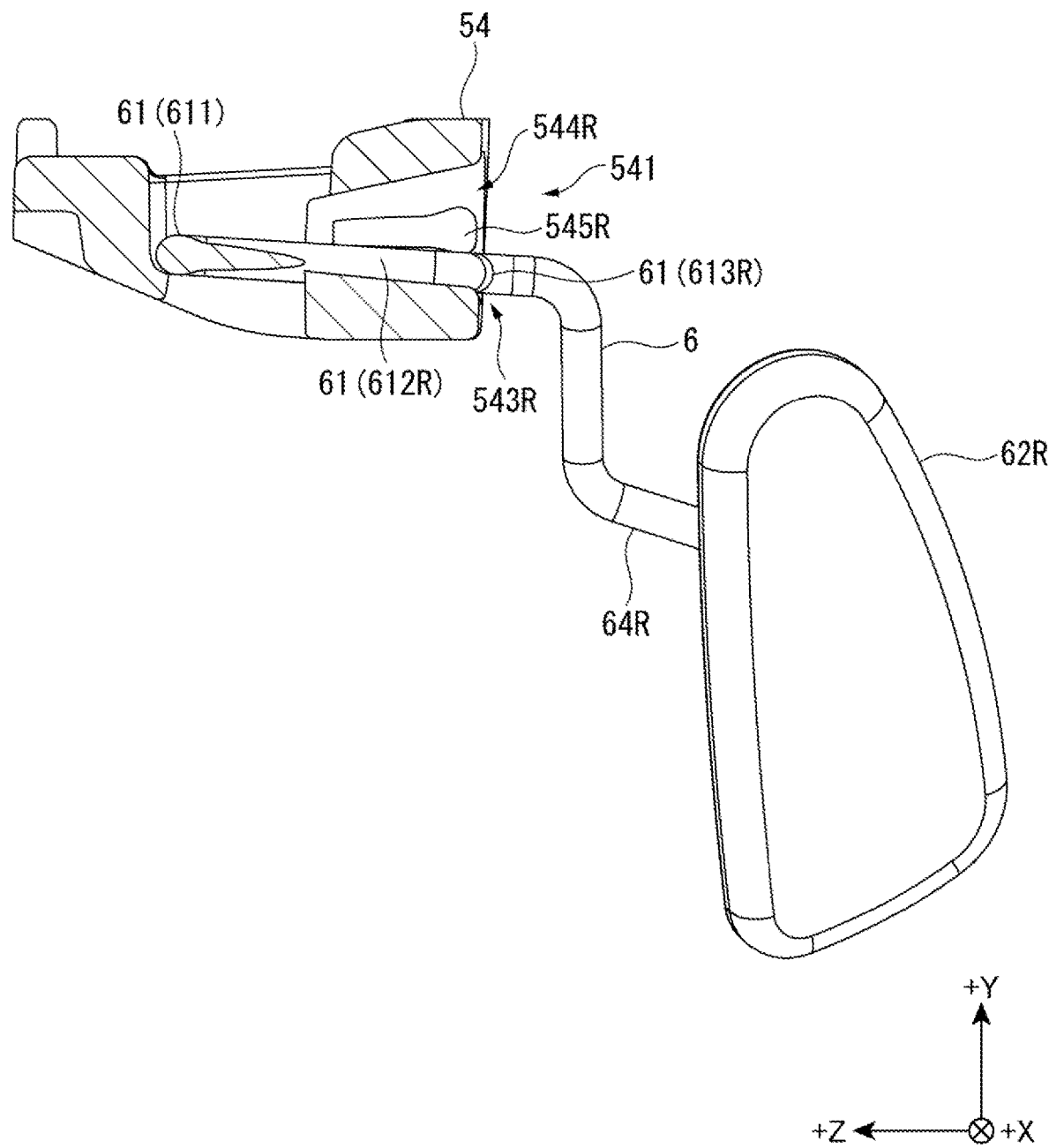
FIG. 12 is a cross-sectional view illustrating the nose pad and the attachment portion disposed in the first position in the exemplary embodiment.

FIG. 11 is a rear view of the nose pad 6 and the attachment portion 54 disposed in a first position when viewed from the −Z direction. FIG. 12 is a view of a cross section along the YZ plane of the nose pad 6 and the attachment portion 54 disposed in the first position when viewed from the −X direction, and is a view of a cross section taken along a XII-XII line in FIG. 11 when viewed from the −X direction. Note that the attachment portion 54 is also simplified in FIGS. 11 and 12.

As illustrated in FIGS. 11 and 12, while the second extending portions 613L and 613R are locked by the first locking portions 543L and 543R, the nose pad 6 is disposed in the first position being a position in the −Y direction in a rotational range of the nose pad 6. In other words, with the nose pad 6 disposed in the first position, the nose rest portions 62L and 62R are disposed in a position in the −Y direction.

Such a first position is a position where the nose pad 6 is disposed such that the nose rest portions 62L and 62R of the nose pad 6 abut a portion in the −Y direction with respect to a portion where nose rest portions of eyeglasses abut a nose of a user wearing the eyeglasses, for example.

Note that, as described above, the connecting portions 64L and 64R of the nose pad 6 are configured such that the fourth components 64L4 and 64R4 are coupled to the rocking support portions 63L and 63R via the second components 64L2 and 64R2 extending in the −Y direction from the first components 64L1 and 64R1 coupled to the second extending portions 613L and 613R, and the third components 64L3 and 64R3 bent in the −Z direction at a position in the −Y direction from the second components 64L2 and 64R2. In other words, the connecting portions 64L and 64R extend in the −Y direction from the second extending portions 613L and 613R and then extend in the −Z direction and are coupled to the rocking support portions 63L and 63R, instead of extending in the −Z direction being a face side of a user from the second extending portions 613L and 613R and then extend in the −Y direction and are coupled to the rocking support portions 63L and 63R. More specifically, the connecting portions 64L and 64R extend slightly in the −Z direction from the second extending portions 613L and 613R and extend in the −Y direction, and then extend in the −Z direction and are coupled to the rocking support portions 63L and 63R, instead of extending in the −Z direction from the second extending portions 613L and 613R to corresponding positions in the +Y direction of the rocking support portions 63L and 63R and then extending downward to the rocking support portions 63L and 63R.

In this way, when the nose pad 6 is disposed in the first position, the nose rest portions 62L and 62R can more easily contact the portion in the −Y direction with respect to the portion where the nose rest portions of the eyeglasses abut the nose of the user wearing the eyeglasses. In other words, the nose rest portions 62L and 62R can abut the nose of the user such that the nose rest portions 62L and 62R and the connecting portions 64L and 64R do not interfere with the frame and the nose rest of the eyeglasses.

Configuration of Second Locking Portion

As illustrated in FIG. 8, the second locking portions 544L and 544R each extend in a direction away from an end portion in the +Y direction of the insertion opening 541 so as to communicate with the insertion opening 541.

Specifically, the second locking portion 544L extends in the −X direction from an inner end edge in the +Y direction of the insertion opening 541, and the second locking portion 544R extends in the +X direction from an inner end edge in the +Y direction of the insertion opening 541. Similarly to the first locking portions 543L and 543R, the second locking portions 544L and 544R are a recessed portion being recessed in the +Z direction. When the insertion portion 61 is inserted into the insertion opening 541, the second extending portion 613L can fit into the second locking portion 544L, and the second extending portion 613R can fit into the second locking portion 544R.

In this way, while the second extending portions 613L and 613R are locked by the second locking portions 544L and 544R, the nose pad 6 is disposed in a second position being a position in the +Y direction in a rotational range of the nose pad 6.

Figure 13:
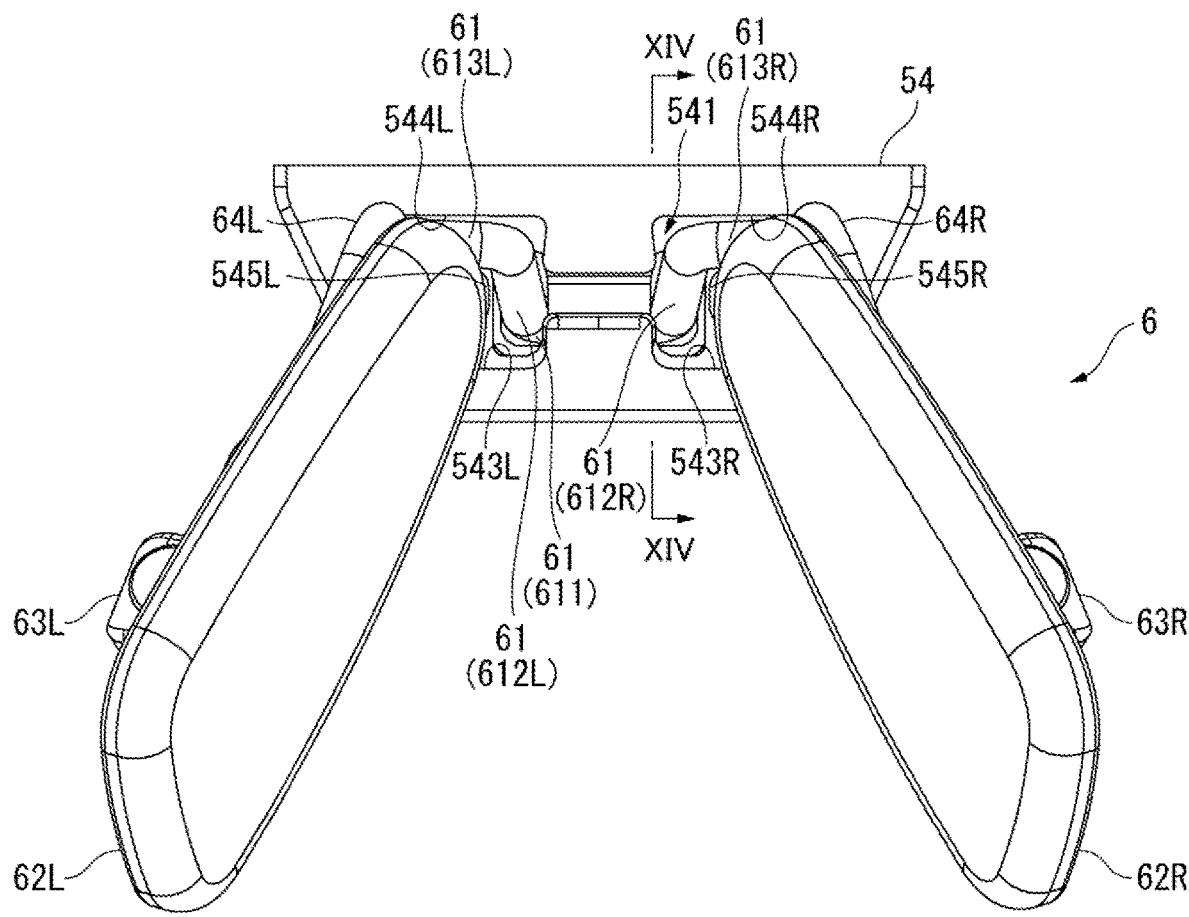
FIG. 13 is a rear view illustrating the nose pad and the attachment portion disposed in a second position in the exemplary embodiment.
Figure 14:
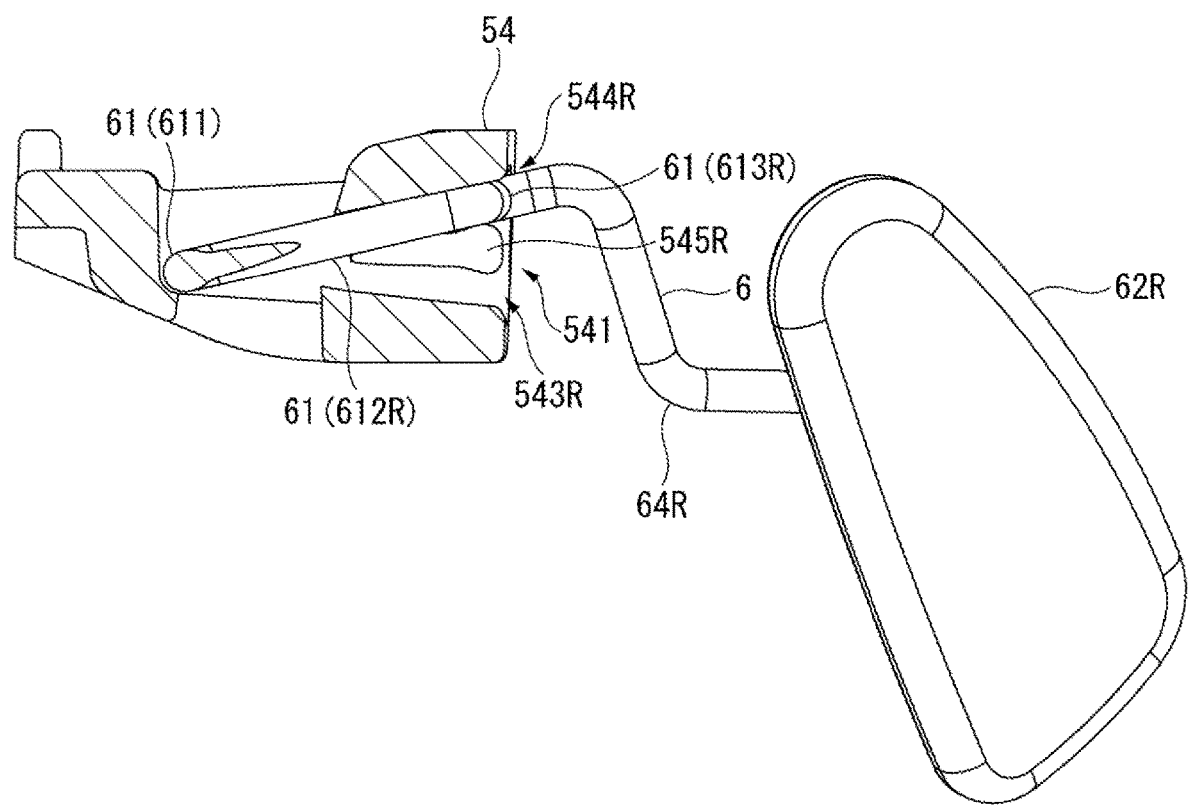
FIG. 14 is a cross-sectional view illustrating the nose pad and the attachment portion disposed in the second position in the exemplary embodiment.

FIG. 13 is a rear view of the nose pad 6 and the attachment portion 54 disposed in the second position when viewed from the −Z direction. FIG. 14 is a view of a cross section along the YZ plane of the nose pad 6 and the attachment portion 54 disposed in the second position when viewed from the −X direction, and is a view of a cross section taken along a XIV-XIV line in FIG. 13 when viewed from the −X direction. Note that the attachment portion 54 is also simplified in FIGS. 13 and 14.

As illustrated in FIGS. 13 and 14, with the nose pad 6 disposed in the second position, the position of the nose rest portions 62L and 62R is in the +Y direction with respect to the position in the first position.

Such a second position is, for example, a position where the nose pad 6 is disposed such that the nose rest portions 62L and 62R of the nose pad 6 abut a portion of a user's nose near eyebrows when the head-mounted display apparatus 1 is mounted on a head of a user who is not wearing eyeglasses. The nose pad 6 is then disposed in the second position, and thus the head-mounted display apparatus 1 can be stably mounted on the head of the user who is not wearing the eyeglasses.

Note that when the nose rest portions 62L and 62R abut the nose of the user, force in the +Z direction is applied to the nose rest portions 62L and 62R, and the connecting portions 64L and 64R displace in a direction away from each other. Thus, a connecting portion of the second extending portion 613L with the connecting portion 64L and a connecting portion of the second extending portion 613R with the connecting portion 64R are pressed against the first locking portions 543L and 543R or the second locking portions 544L and 544R. In other words, the opposite end portions of the second extending portions 613L and 613R are pressed against the first locking portion 543L and 543R and the second locking portions 544L and 544R.

In this way, when the head-mounted display apparatus 1 is mounted, detachment of the second extending portions 613L and 613R from the first locking portions 543L and 543R or the second locking portions 544L and 544R is suppressed, and thus a position shift of the nose pad 6 is suppressed.

Configuration of Regulating Portion

As illustrated in FIG. 8, the regulating portion 545L is located between the first locking portion 543L and the second locking portion 544L in the +Y direction, and the regulating portion 545R is located between the first locking portion 543R and the second locking portion 544R in the +Y direction. Then, although not illustrated in the drawing, a surface in the −Z direction of the regulating portions 545L and 545R is located in the −Z direction with respect to a portion facing a surface in the +Z direction of the second extending portions 613L and 613R in the first locking portions 543L and 543R being a recessed portion into which the respective second extending portions 613L and 613R fit. Further, the surface in the −Z direction of the regulating portions 545L and 545R is located in the −Z direction with respect to the portion facing the surface in the +Z direction of the second extending portions 613L and 613R in the second locking portions 544L and 544R being a recessed portion into which the respective second extending portions 613L and 613R fit. In other words, the surface in the −Z direction of the regulating portions 545L and 545R is located in the −Z direction with respect to a bottom portion of the first locking portions 543L and 543R that are each a recessed portion, and is located in the −Z direction with respect to a bottom portion of the second locking portions 544L and 544R that are each a recessed portion. Put another way, the regulating portion 545L protrudes in the −Z direction from the portion facing the surface in the +Z direction of the second extending portion 613L in the first locking portion 543L and the second locking portion 544L that are each a recessed portion, and the regulating portion 545R protrudes in the −Z direction from the portion facing the surface in the +Z direction of the second extending portion 613R in the first locking portion 543R and the second locking portion 544R that are each a recessed portion.

The regulating portions 545L and 545R regulate unintended rotation of the nose pad 6 in the ±D direction when the head-mounted display apparatus 1 is mounted. In other words, the regulating portions 545L and 545R suppress rotation of the nose pad 6 disposed in the first position in the +D direction by abutting the second extending portions 613L and 613R, thereby suppressing an unintended change in the position of the nose pad 6 to the second position. Similarly, the regulating portions 545L and 545R suppress rotation of the nose pad 6 disposed in the second position in the −D direction by abutting the second extending portions 613L and 613R, thereby suppressing an unintended change in the position of the nose pad 6 to the first position.

On the other hand, the second extending portions 613L and 613R are displaced in a direction closer to each other such that the intersection angle $\alpha L$ between the first extending portion 612L and the second extending portion 613L is increased, and the intersection angle $\alpha R$ between the first extending portion 612R and the second extending portion 613R is also increased. Thus, the nose pad 6 can be rotated in the ±D direction while avoiding the regulating portions 545L and 545R. At this time, since the intersection angles αL and αR are each an obtuse angle, the second extending portions 613L and 613R can be easily displaced with respect to the first extending portions 612L and 612R. Therefore, an intended position change of the nose pad 6 can be easily performed.

Effects of Exemplary Embodiment

The head-mounted display apparatus 1 according to the present exemplary embodiment described above can obtain the following advantages.

The head-mounted display apparatus 1 includes the display unit 3 configured to emit image light to display an image, the support portion 5 that supports the display unit 3, and the nose pad 6 attached to the support portion 5. The support portion 5 includes the attachment portion 54 to which the nose pad 6 is attached. The nose pad 6 includes the insertion portion 61 inserted into the attachment portion 54. The attachment portion 54 includes the insertion opening 541 into which the insertion portion 61 is inserted, and the first locking portions 543L and 543R and the second locking portions 544L and 544R serving as locking portions each capable of locking the nose pad 6 in the first position and the second position that are different from each other in the rotational range of the nose pad 6 centered at the insertion portion 61 inserted into the insertion opening 541.

Accordingly, the nose pad 6 is rotated in the ±D direction as necessary while the insertion portion 61 is inserted into the insertion opening 541 provided in the attachment portion 54, and thus the second extending portions 613L and 613R are locked by the first locking portions 543L and 543R and the second locking portions 544L and 544R, thereby locking the nose pad 6 in the first position or the second position. Thus, the configuration of the attachment portion 54 that movably holds the nose pad 6 can be simplified compared to a case where an attachment portion has a structure that holds a nose pad to be slidable vertically, such as by providing a latch member. Therefore, the configuration of the head-mounted display apparatus 1 capable of adjusting a position of the nose pad 6 can be simplified, and the head-mounted display apparatus 1 can be easily assembled.

The nose pad 6 includes the nose rest portions 62L and 62R as a first nose rest portion and a second nose rest portion. The rotational direction of the nose pad 6 attached to the attachment portion 54 is the ±Y direction intersecting the X axis being the first axis that connects the nose rest portion 62L and the nose rest portion 62R when viewed from the −Z direction being the first direction in which the display unit 3 emits image light. Then, the attachment portion 54 includes, as locking portions, the first locking portions 543L and 543R configured to lock the nose pad 6 in the first position, and the second locking portions 544L and 544R configured to lock the nose pad 6 in the second position.

In this way, when viewed from the −Z direction, the nose pad 6 can be disposed in the first position or the second position being a position different in the ±Y direction being the vertical direction for the user wearing the head-mounted display apparatus 1. In this way, a position of the nose pad 6, that is, a position of the nose rest portions 62L and 62R can be adjusted depending on the size of a nose of the user, whether the user is wearing eyeglasses, or the like. Therefore, the mountability of the head-mounted display apparatus 1 can be increased.

The attachment portion 54 includes the rotation support portion 542 that is located inside the insertion opening 541, is configured to engage with the shaft portion 611 being the tip portion of the insertion portion 61 in the +Z direction, which is the insertion direction into the insertion opening 541, and rotatably supports the nose pad 6 about the shaft portion 611.

In this way, the rotation support portion 542 rotatably supports the nose pad 6 about the shaft portion 611 by engaging with the shaft portion 611 along the X axis. Thus, compared to a case where, for example, the rotation support portion 542 rotatably supports a center portion of the insertion portion 61 in the +Z direction, the dimension of the attachment portion 54 in the Y axis can be reduced. Therefore, an increase in size of the attachment portion 54 can be suppressed, and thus an increase in size of the head-mounted display apparatus 1 can be suppressed.

The insertion portion 61 includes the shaft portion 611 that extends along the X axis when viewed from the +Z direction being the first direction, and is rotatably supported by the rotation support portion 542, the two first extending portions 612L and 612R extending in the −Z direction from the end portions of the shaft portion 611 in the −X direction and the +X direction, and the two second extending portions 613L and 613R extending in the direction away from each other from the two first extending portions 612L and 612R opposite to the shaft portion 611. The second extending portions 613L and 613R are locked by one of the first locking portions 543L and 543R and the second locking portions 544L and 544R.

In this way, the nose pad 6 can be easily rotated in the ±D direction about the shaft portion 611, and thus a position of the nose rest portions 62L and 62R can be easily changed in the ±Y direction. Further, the second extending portions 613L and 613R extending from the first extending portions 612L and 612R in the direction away from each other are locked by the first locking portions 543L and 543R, and thus the nose pad 6 can be stably locked in the first position. The second extending portions 613L and 613R are locked by the second locking portions 544L and 544R, and thus the nose pad 6 can be stably locked in the second position. Therefore, a position shift of the nose pad 6 can be suppressed.

The first locking portions 543L and 543R and the second locking portions 544L and 544R are recessed portions into which the two second extending portions 613L and 613R fit.

In this way, the configuration of the first locking portions 543L and 543R configured to lock the nose pad 6 in the first position and the configuration of the second locking portions 544L and 544R configured to lock the nose pad 6 in the second position can be simplified. Therefore, the configuration of the attachment portion 54, and thus the configuration of the head-mounted display apparatus 1 can be simplified.

The attachment portion 54 includes the regulating portion 545L that is located between the first locking portion 543L and the second locking portion 544L, and is configured to abut the second extending portion 613L, and to regulate rotation of the nose pad 6 in the ±D direction. Further, the attachment portion 54 includes the regulating portion 545R that is located between the first locking portion 543R and the second locking portion 544R, and is configured to abut the second extending portion 613R to regulate rotation of the nose pad 6 in the ±D direction.

In this way, disposing the nose pad 6 in a position other than the first position and the second position can be suppressed, and the unintended rotation of the nose pad 6 can also be regulated. Therefore, a position shift of the nose pad 6 can be effectively suppressed.

The second extending portions 613L and 613R have flexibility that can bring the second extending portions 613L and 613R to be closer to and away from each other.

In this way, the nose pad 6 can be rotated by bending the second extending portions 613L and 613R in the direction closer to each other, and a position of the nose pad 6 can be changed. Then, the second extending portions 613L and 613R can be locked by the first locking portions 543L and 543R or the second locking portions 544L and 544R by expanding the second extending portions 613L and 613R in the direction away from each other from the state where the second extending portions 613L and 613R are bent in the direction closer to each other. Therefore, a position of the nose pad 6 can be easily adjusted.

The nose pad 6 includes the nose rest portions 62L and 62R, the rocking support portions 63L and 63R that rockingly support the nose rest portions 62L and 62R, and the connecting portions 64L and 64R that couple the insertion portion 61 and the rocking support portions 63L and 63R. The connecting portions 64L and 64R include the first components 64L1 and 64R1, the second components 64L2 and 64R2, the third components 64L3 and 64R3, and the fourth components 64L4 and 64R4, respectively. The first components 64L1 and 64R1 extend in the −Z direction being a direction away from the insertion portion 61. The second components 64L2 and 64R2 extend from the first components 64L1 and 64R1 in the −Y direction that intersects each of the +X direction parallel to the X axis connecting the nose rest portions 62L and 62R and the +Z direction being the insertion direction of the insertion portion 61 with respect to the attachment portion 54, and that is directed from the insertion portion 61 toward the nose rest portions 62L and 62R. The third components 64L3 and 64R3 are bent with respect to the second components 64L2 and 64R2 in a direction along the extending direction of the second components 64L2 and 64R2 and away from the insertion portion 61, namely, in the −Z direction at a position in the −Y direction. The fourth components 64L4 and 64R4 extend from the third components 64L3 and 64R3 and are coupled to the corresponding rocking support portions 63L and 63R.

In this way, for example, when the head-mounted display apparatus 1 is mounted on a head of a user wearing eyeglasses, interference of the nose pad 6 with the eyeglasses can be suppressed compared to a case where a second component constituting a connecting portion extends in the −Z direction, and a third component then extends in the −Y direction and is coupled to a rocking support portion. Therefore, the nose rest portions 62L and 62R can abut the nose of the user while avoiding bridges and nose rest portions of the eyeglasses, and the mountability of the head-mounted display apparatus 1 can be increased.

The display unit 3 includes the left-side light guiding unit 32L configured to guide the left eye image and the right-side light guiding unit 32R configured to guide the right eye image. The support portion 5 includes the frame 53 that supports the left-side light guiding unit 32L and the right-side light guiding unit 32R. The attachment portion 54 is located between the left-side light guiding unit 32L and the right-side light guiding unit 32R, and attaches the left-side light guiding unit 32L and the right-side light guiding unit 32R to the frame 53.

In this way, the attachment portion 54 can be used as a member that supports the nose pad 6 and as a member that attaches the left-side light guiding unit 32L and the right-side light guiding unit 32R to the frame 53. Thus, there is no need to separately provide a member that attaches the left-side light guiding unit 32L and the right-side light guiding unit 32R to the frame 53, in addition to the attachment portion 54 that supports the nose pad 6. Therefore, an increase in the number of parts of the support portion 5, and thus an increase in the number of parts of the head-mounted display apparatus 1 can be suppressed.

Further, since the attachment portion 54 is disposed between the left-side light guiding unit 32L and the right-side light guiding unit 32R, the nose pad 6 supported by the attachment portion 54 can easily abut the nose of the user wearing the head-mounted display apparatus 1. Therefore, the mountability of the head-mounted display apparatus 1 can be further increased.

Modification of Exemplary Embodiment

The present disclosure is not limited to the exemplary embodiment described above, and variations, modifications, and the like within the scope in which the object of the present disclosure can be achieved are included in the present disclosure.

In the above-described exemplary embodiment, the nose pad 6 is rotatably supported by the attachment portion 54 about the rotational movement shaft along the X axis. However, the exemplary embodiment is not limited thereto, and a nose pad may be configured to be rotatably supported by an attachment portion about a rotational movement shaft along the Y axis, for example. In other words, the rotational movement shaft of the nose pad is not limited to the rotational movement shaft along the X axis.

In the above-described exemplary embodiment, the nose pad 6 is locked, by the attachment portion 54, in the first position and the second position that are positions different from each other in the rotational direction of the nose pad 6, and the attachment portion 54 includes the first locking portions 543L and 543R configured to lock the nose pad 6 in the first position, and the second locking portions 544L and 544R configured to lock the nose pad 6 in the second position. However, the exemplary embodiment is not limited to this, and an attachment portion may include a locking portion capable of locking a nose pad in a third position different from the first position and the second position in a rotational direction of the nose pad. In other words, the number of locking portions included in the attachment portion may be three or more.

In the above-described exemplary embodiment, when the insertion portion 61 of the nose pad 6 is inserted into the insertion opening 541 of the attachment portion 54 along the +Z direction, the second extending portions 613L and 613R are locked by the first locking portions 543L and 543R. In other words, when the insertion portion 61 is inserted into the insertion opening 541, the second extending portions 613L and 613R are locked by the first locking portions 543L and 543R located in the −Y direction with respect to the second locking portions 544L and 544R. However, the exemplary embodiment is not limited to this. For example, when the second locking portions 544L and 544R are provided in the −Y direction with respect to the first locking portions 543L and 543R, and the like, a locking portion configured to lock the nose pad 6 when the insertion portion 61 is inserted into the insertion opening 541 may not necessarily need to be a locking portion in the −Y direction.

In the above-described exemplary embodiment, the first locking portions 543L and 543R configured to lock the nose pad 6 in the first position lock the second extending portions 613L and 613R, and the second locking portions 544L and 544R configured to lock the nose pad 6 in the second position lock the second extending portions 613L and 613R. However, the exemplary embodiment is not limited to this, and a portion of a nose pad locked by a first locking portion and a second locking portion as locking portions is not limited to the second extending portions 613L and 613R. For example, a locking portion may be configured to lock the first extending portions 612L and 612R.

Further, the attachment portion 54 may be configured to include one first locking portion of the first locking portions 543L and 543R, or may be configured to include one second locking portion of the second locking portions 544L and 544R.

In the above-described exemplary embodiment, in the rotational range of the nose pad 6, the position of the nose pad 6 in which the extending direction of the first extending portions 612L and 612R is along the −Z direction is the first position, and the position of the nose pad 6 in which the extending direction of the first extending portions 612L and 612R is inclined in the +Y direction is the second position. However, the exemplary embodiment is not limited to this, and the first position and the second position can be appropriately changed. For example, a position of a nose pad in which an extending direction of a first extending portion is inclined in the −Y direction may be a first position, and a position of the nose pad in which an extending direction of the first extending portion is inclined in the +Y direction may be a second position.

In the above-described exemplary embodiment, the attachment portion 54 includes the rotation support portion 542 that rotatably supports the shaft portion 611 being the tip portion of the insertion portion 61. However, the exemplary embodiment is not limited to this, and a portion supported by the attachment portion 54 as the rotational movement shaft of the nose pad 6 is not limited to the end portion in the +Z direction of the insertion portion 61. For example, the first extending portions 612L and 612R may be each provided with a shaft portion along the X axis, and a rotation support portion may be configured to rotatably support each of the shaft portions.

Further, the shaft portion 611 may not necessarily be cylindrical, and a tip portion of the insertion portion 61 that abuts the rotation support portion may be formed in an arc shape in the rotational range of the nose pad 6.

In the above-described exemplary embodiment, the nose pad 6 includes, as the first nose rest portion and the second nose rest portion, the nose rest portion 62L that abuts the portion on the left side of the user's nose, and the nose rest portion 62R that abuts the portion on the right side of the user's nose. Here, the first nose rest portion and the second nose rest portion may be integrated. In other words, the nose pad 6 may include, instead of the nose rest portions 62L and 62R, a nose rest portion that covers a part of the user's nose on the front surface side and abuts each of portions on the left and right sides of the user's nose. In this case, of the integrated nose rest portion, a portion that abuts the portion on the left side of the user's nose corresponds to a left-side nose rest portion, and a portion that abuts the portion on the right side of the user's nose corresponds to a right-side nose rest portion. Then, one of the left-side nose rest portion and the right-side nose rest portion corresponds to a first nose rest portion, and the other corresponds to a second nose rest portion.

In the above-described exemplary embodiment, the nose pad 6 includes the nose rest portions 62L and 62R. Here, the nose pad 6 may include three or more nose rest portions. For example, the nose pad 6 may include a nose rest portion that abuts a root or a line of the user's nose in addition to the nose rest portions 62L and 62R. In this case, of the plurality of nose rest portions, a nose rest portion that abuts a portion on the left side of the user's nose may be defined as the nose rest portion 62L, and a nose rest portion that abuts a portion on the right side of the user's nose may be defined as the nose rest portion 62R. In this case, of the nose rest portion that abuts the portion on the left side of the user's nose and the nose rest portion that abuts the portion on the right side of the user's nose, one nose rest portion corresponds to a first nose rest portion, and the other nose rest portion corresponds to a second nose rest portion.

In the above-described exemplary embodiment, the two second extending portions 613L and 613R are locked by one of the first locking portions 543L and 543R and the second locking portions 544L and 544R. In other words, when the two second extending portions 613L and 613R are locked by the first locking portions 543L and 543R, the second extending portion 613L is locked by the first locking portion 543L, and the second extending portion 613R is locked by the first locking portion 543R. Further, when the two second extending portions 613L and 613R are locked by the second locking portions 544L and 544R, the second extending portion 613L is locked by the second locking portion 544L, and the second extending portion 613R is locked by the second locking portion 544R. However, the exemplary embodiment is not limited to this. When the two second extending portions 613L and 613R are locked, only one second extending portion of the second extending portions 613L and 613R may be locked. In other words, one first locking portion of the first locking portions 543L and 543R may not be needed, and one second locking portion of the second locking portions 544L and 544R may not be needed. Further, when the second extending portions 613L and 613R are locked in the first position, one second extending portion of the second extending portions 613L and 613R may be locked by the first locking portion. When the second extending portions 613L and 613R are locked in the second position, the other second extending portion of the second extending portions 613L and 613R may be locked by the second locking portion.

In the above-described exemplary embodiment, the first locking portions 543L and 543R and the second locking portions 544L and 544R are recessed portions into which the second extending portions 613L and 613R fit. However, the exemplary embodiment is not limited to this. A configuration of the first locking portion is not limited to a recessed portion as long as the nose pad 6 can be locked in the first position. Similarly, a configuration of the second locking portion is not limited to a recessed portion as long as the nose pad 6 can be locked in the second position.

In the above-described exemplary embodiment, the surface in the −Z direction of the regulating portions 545L and 545R configured to regulate the rotation of the nose pad 6 disposed in the first position or the second position is located in the −Z direction with respect to the portion facing the surface in the +Z direction of the second extending portions 613L and 613R in the first locking portions 543L and 543R and the second locking portions 544L and 544R that are each a recessed portion. However, the exemplary embodiment is not limited to this. A position in the +Z direction of the regulating portions 545L and 545R with respect to the first locking portions 543L and 543R and the second locking portions 544L and 544R may be appropriately changed depending on the configuration of the first locking portions 543L and 543R and the second locking portions 544L and 544R, and the configuration of the regulating portions 545L and 545R.

In the above-described exemplary embodiment, the attachment portion 54 includes the regulating portion 545L located between the first locking portion 543L and the second locking portion 544L, and the regulating portion 545R located between the first locking portion 543R and the second locking portion 544R. However, the exemplary embodiment is not limited to this. The regulating portions 545L and 545R may not be necessarily needed in a case where the first locking portions 543L and 543R and the second locking portions 544L and 544R can sufficiently lock the nose pad 6. Further, the attachment portion 54 may be configured to include one regulating portion of the regulating portions 545L and 545R.

In the above-described exemplary embodiment, a position of the nose pad 6 can change in the attachment portion 54 by bending the second extending portions 613L and 613R in the direction closer to each other in the X axis. In other words, the nose pad 6 can rotate in the ±D direction about the shaft portion 611 by bending the second extending portions 613L and 613R in the direction closer to each other in the X axis. However, the exemplary embodiment is not limited to this. For example, the first extending portions 612L and 612R may expand and contract along the Z axis, and the second extending portions 613L and 613R are brought away from the first locking portions 543L and 543R and the second locking portions 544L and 544R, and thus a nose pad may be configured to rotate about a rotational movement shaft along the X axis and be able to have a position being changed in an attachment portion.

Further, the intersection angle αL between the first extending portion 612L and the second extending portion 613L, and the intersection angle αR between the first extending portion 612R and the second extending portion 613R are each an obtuse angle. However, the exemplary embodiment is not limited to this, and the intersection angles αL and αR may be another angle, such as a right angle.

In the above-described exemplary embodiment, the connecting portions 64L and 64R as the first connecting portion and the second connecting portion that couple the insertion portion 61 and the rocking support portions 63L and 63R in the nose pad 6 include the first components 64L1 and 64R1, the second components 64L2 and 64R2, the third components 64L3 and 64R3, and the fourth components 64L4 and 64R4. However, the exemplary embodiment is not limited to this, and a bending direction of the connecting portions 64L and 64R can be appropriately changed.

Further, the nose pad 6 also includes the rocking support portions 63L and 63R that rockingly support the nose rest portions 62L and 62R. However, the exemplary embodiment is not limited to this, and a nose pad may be configured to include, instead of a rocking support portion, a fixing portion to which the nose rest portions 62L and 62R are fixed.

Furthermore, the nose pad 6 is configured to be left-right symmetrical about the center plane passing through the center in the X axis of the nose pad 6 and along the YZ plane. However, the exemplary embodiment is not limited to this, and the nose pad 6 may not be left-right symmetrical. For example, only one connecting portion of the connecting portions 64L and 64R may be configured as described above, and the other connecting portion may have another configuration. Furthermore, a shape of a nose pad is not limited to that above, and can be appropriately changed.

In the above-described exemplary embodiment, the display unit 3 includes the left-side light guiding unit 32L constituting the left-side display unit 3L, and also the right-side light guiding unit 32R constituting the right-side display unit 3R. However, the exemplary embodiment is not limited to this. For example, a display unit may be configured to include one of a left-side display unit and a right-side display unit. Further, the left-side light guiding unit 32L and the right-side light guiding unit 32R may be integrated.

Furthermore, the attachment portion 54 has the function of attaching the left-side light guiding unit 32L and the right-side light guiding unit 32R to the frame 53. However, the exemplary embodiment is not limited to this. The attachment of the left-side light guiding unit 32L and the right-side light guiding unit 32R to the frame 53 may be performed by another member different from the attachment portion 54.

What is claimed is:

1. A head-mounted display apparatus, comprising:
a display unit configured to emit image light to display an image;
a support portion that supports the display unit; and
a nose pad attached to the support portion, wherein
the support portion includes an attachment portion to which the nose pad is attached,
the nose pad includes an insertion portion inserted into the attachment portion, and
the attachment portion includes
an insertion opening into which the insertion portion is inserted, and
a locking portion configured to lock the nose pad in a first position and a second position that are different from each other in a rotational range of the nose pad centered at the insertion portion inserted into the insertion opening.

2. The head-mounted display apparatus according to claim 1, wherein
the nose pad includes a first nose rest portion and a second nose rest portion,
a rotational direction of the nose pad is a direction intersecting a first axis that connects the first nose rest portion and the second nose rest portion when viewed from a first direction in which the display unit emits the image light, and
the attachment portion includes, as the locking portion,
a first locking portion configured to lock the nose pad in the first position, and
a second locking portion configured to lock the nose pad in the second position.

3. The head-mounted display apparatus according to claim 2, wherein
the attachment portion includes a rotation support portion that is located inside the insertion opening, is configured to engage with a tip portion of the insertion portion in an insertion direction into the insertion opening, and is configured to rotatably support the nose pad about the tip portion.

4. The head-mounted display apparatus according to claim 3, wherein
the insertion portion includes
a shaft portion that extends along the first axis when viewed from the first direction, and is supported by the rotation support portion to serve as a rotational movement shaft of the nose pad,
two first extending portions extending in the first direction from a first end side and a second end side of the shaft portion, and
two second extending portions respectively extending, in directions that are away from each other, from sides of the two first extending portions opposite from the shaft portion, and
at least one second extending portion of the two second extending portions is locked by one of the first locking portion and the second locking portion.

5. The head-mounted display apparatus according to claim 4, wherein
each of the first locking portion and the second locking portion is a recessed portion into which the two second extending portions fit.

6. The head-mounted display apparatus according to claim 4, wherein
the attachment portion includes a regulating portion that is located between the first locking portion and the second locking portion, and is configured to abut the two second extending portions to regulate rotation of the nose pad.

7. The head-mounted display apparatus according to claim 4, wherein
the two second extending portions have flexibility such that the two second extending portions move toward and away from each other.

8. The head-mounted display apparatus according to claim 1, wherein
the nose pad includes
a first nose rest portion and a second nose rest portion,
a first rocking support portion that rockingly supports the first nose rest portion,
a second rocking support portion that rockingly supports the second nose rest portion,
a first connecting portion that couples the insertion portion and the first rocking support portion, and
a second connecting portion that couples the insertion portion and the second rocking support portion, and
at least one connecting portion of the first connecting portion and the second connecting portion includes
a first component extending in a direction away from the insertion portion,
a second component extending from the first component in a direction that intersects each of a direction parallel to a first axis connecting the first nose rest portion and the second nose rest portion and an insertion direction of the insertion portion with respect to the attachment portion, and that is directed from the insertion portion toward a nose rest portion, coupled to the at least one connecting portion, among the first nose rest portion and the second nose rest portion,
a third component being bent with respect to the second component in a direction along an extending direction of the second component and away from the insertion portion, and
a fourth component that extends from the third component, and is coupled to a rocking support portion, coupled to the at least one connecting portion, among the first rocking support portion and the second rocking support portion.

9. The head-mounted display apparatus according to claim 1, wherein
the display unit includes
a left-side light guiding unit configured to guide left eye image, and
a right-side light guiding unit configured to guide right eye image,
the support portion includes a frame that supports the left-side light guiding unit and the right-side light guiding unit, and
the attachment portion is located between the left-side light guiding unit and the right-side light guiding unit, and attaches the left-side light guiding unit and the right-side light guiding unit to the frame.

* * * * *